United States Patent
Ikeda

(10) Patent No.: US 12,257,506 B2
(45) Date of Patent: Mar. 25, 2025

(54) GAME SYSTEM, SERVER SYSTEM, METHOD OF PERFORMING A GAME AND METHOD OF PROVIDING INFORMATION ON A GAME

(71) Applicant: BANDAI NAMCO Entertainment Inc., Tokyo (JP)

(72) Inventor: Kohei Ikeda, Kawasaki (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 184 days.

(21) Appl. No.: 18/249,206

(22) PCT Filed: Oct. 12, 2021

(86) PCT No.: PCT/JP2021/037766
§ 371 (c)(1),
(2) Date: Apr. 14, 2023

(87) PCT Pub. No.: WO2022/080380
PCT Pub. Date: Apr. 21, 2022

(65) Prior Publication Data
US 2023/0405464 A1    Dec. 21, 2023

(30) Foreign Application Priority Data

Oct. 15, 2020  (JP) .................................. 2020-173930

(51) Int. Cl.
*A63F 13/5375* (2014.01)
*A63F 13/493* (2014.01)
(Continued)

(52) U.S. Cl.
CPC ........ *A63F 13/5375* (2014.09); *A63F 13/493* (2014.09); *A63F 13/497* (2014.09);
(Continued)

(58) Field of Classification Search
CPC .. A63F 13/5375; A63F 13/493; A63F 13/497; A63F 13/833; A63F 2300/305; A63F 2300/636
(Continued)

(56) References Cited

U.S. PATENT DOCUMENTS 6,699,127 B1    3/2004  Lobb et al.
8,328,643 B1 *  12/2012 Osvald .................. A63F 13/798
463/9
(Continued)

FOREIGN PATENT DOCUMENTS

JP    2001-276435 A    10/2001
JP    2005-046280 A    2/2005
(Continued)

OTHER PUBLICATIONS

U.S. Appl. No. 18/249,166, filed Apr. 14, 2023, Ikeda.
(Continued)

*Primary Examiner* — Allen Chan
(74) *Attorney, Agent, or Firm* — Posz Law Group, PLC

(57) ABSTRACT

The game system is configured to perform: a stop-playing process to stop-playing the game during playing the game; a game status identification process to identify a game status at the stop-playing by the stop-playing process; a task setting process to set, as a task of the game, the identified task by performing the task identification process to identify the task information corresponding to an identified game status from among the task information stored; and a task presentation process to present, to player, as a new task of the task setting target game which is stopping-playing at the stop-playing timing.

13 Claims, 15 Drawing Sheets

(51) Int. Cl.
*A63F 13/497* (2014.01)
*A63F 13/833* (2014.01)

(52) U.S. Cl.
CPC ....... *A63F 13/833* (2014.09); *A63F 2300/305* (2013.01); *A63F 2300/636* (2013.01)

(58) Field of Classification Search
USPC .......................................................... 463/36
See application file for complete search history.

(56) References Cited

U.S. PATENT DOCUMENTS

| | | | | |
|---|---|---|---|---|
| 9,028,331 | B2* | 5/2015 | Uchiyama | A63F 13/77 |
| | | | | 463/40 |
| 10,671,954 | B2* | 6/2020 | Sinha | G06Q 10/10 |
| 2010/0248830 | A1 | 9/2010 | Otomo et al. | |
| 2013/0014033 | A1* | 1/2013 | Hamick | G06Q 50/01 |
| | | | | 715/757 |
| 2015/0224409 | A1 | 8/2015 | Hayashida | |
| 2018/0005483 | A1* | 1/2018 | Washington | G07F 17/3213 |

FOREIGN PATENT DOCUMENTS

| | | |
|---|---|---|
| JP | 2010-233734 A | 10/2010 |
| JP | 5441103 B2 | 3/2014 |
| JP | 2015-153101 A | 8/2015 |
| JP | 2017-077350 A | 4/2017 |

OTHER PUBLICATIONS

Konami Official Guide, Konami Official Perfect Guide for "World Soccer Winning Eleven International", Konami Official Perfect Series, Mar. 18, 2004, pp. 11, 32-39, Konami Corporation, Japan.
International Search Report dated Jan. 11, 2022, issued in corresponding International Patent Application No. PCT/JP2021/037766 (and English Machine Translation).

* cited by examiner

| GAME IDENTIFICATION STATUS | TASK | |
|---|---|---|
| LEVEL 1-10 | ENEMY CHARACTER | 2 |
| LEVEL 11-30 | ENEMY CHARACTER | 5 |
| LEVEL 31-60 | ENEMY CHARACTER | 5 |
| | BOSS CHARACTER | 1 |
| LEVEL 61-90 | ENEMY CHARACTER | 10 |
| | BOSS CHARACTER | 1 |
| LEVEL 91-100 | ENEMY CHARACTER | 20 |
| | BOSS CHARACTER | 2 |

| PLAYER | INSTRUCTION ACCEPTANCE TIME(SEC) | | | | | |
|---|---|---|---|---|---|---|
| | 0 | 5 | 6 | 8 | 10 | ... |
| INSTRUCTION OF PLAYER A | BACK | DOWN;RIGHT FOOT | — — | LEFT FOOT | — — | ... |
| INSTRUCTION OF PLAYER B | UP | BACK;BACK;RIGHT HAND;LEFT HAND | UP;LEFT HAND | — — | LEFT HAND; RIGHT HAND; RIGHT FOOT | ... |

FIG. 5B

| PLAYER | | INSTRUCTION ACCEPTANCE TIME(SEC) | | | | | |
|---|---|---|---|---|---|---|---|
| | | 0 | 5 | 6 | 8 | 10 | ... |
| PLAYER A | COORDINATES(X,Y,Z) | | | | | | ... |
| | MOTION | | | | | | ... |
| | STATUS | | | | | | ... |
| PLAYER B | COORDINATES(X,Y,Z) | | | | | | ... |
| | MOTION | | | | | | ... |
| | STATUS | | | | | | ... |

FIG. 6A

| GAME ID:001<br>PLAYER ID(A):101<br>PLAYER ID(B):CPU<br>2020/9/10 | INSTRUCTION ACCEPTANCE TIME(SEC) | | | | |
|---|---|---|---|---|---|
| | 0 | 5 | 6 | 8 | 10 |
| INSTRUCTION OF PLAYER A | BACK | DOWN; RIGHT FOOT | --- | LEFT FOOT | --- |
| INSTRUCTION OF PLAYER B | UP | BACK; BACK; RIGHT HAND; LEFT HAND | UP; LEFT HAND | --- | LEFT HAND; RIGHT HAND; RIGHT FOOT |

FIG. 6B

| GAME ID:001<br>PLAYER ID(A):121<br>PLAYER ID(B):CPU<br>2020/9/14 | | INSTRUCTION ACCEPTANCE TIME(SEC) | | | | | |
|---|---|---|---|---|---|---|---|
| | | 0 | 5 | 6 | 8 | 10 | ⋮ |
| PLAYER A | COORDINATES(X,Y,Z) | | | | | | |
| | MOTION | | | | | | |
| | STATUS | | | | | | |
| PLAYER B | COORDINATES(X,Y,Z) | | | | | | |
| | MOTION | | | | | | |
| | STATUS | | | | | | |

| GAME IDENTIFICATION STATUS | CHARACTER TYPE | TASK | |
|---|---|---|---|
| LEVEL 1-10 | ATTRIBUTION A | ENEMY CHARACTER | 2 |
| | ATTRIBUTION B | ENEMY CHARACTER | 3 |
| | ATTRIBUTION C | ENEMY CHARACTER +ONLY COMBO | 3 |
| | ATTRIBUTION D | ENEMY CHARACTER +ONLY COMBO | 5 |
| LEVEL 11-30 | ATTRIBUTION A | ENEMY CHARACTER | 5 |
| | ATTRIBUTION B | ENEMY CHARACTER | 10 |
| | ATTRIBUTION C | ENEMY CHARACTER +ONLY COMBO | 10 |
| | ATTRIBUTION D | ENEMY CHARACTER +ONLY COMBO | 20 |
| ... | ... | ... | ... |

FIG. 9

GAME SYSTEM, SERVER SYSTEM, METHOD OF PERFORMING A GAME AND METHOD OF PROVIDING INFORMATION ON A GAME

CROSS REFERENCE TO RELATED APPLICATION

This application is a U.S. national stage application of PCT/JP2021/037766 filed on Oct. 12, 2021, which claims priority to Japanese application number 2020-173930 filed on Oct. 15, 2020, the contents of which are incorporated herein by reference.

TECHNICAL FIELD

The present invention relates to a game system, a server system, a method of performing a game, and a method of providing information on a game.

BACKGROUND OF THE INVENTION

In recent years, a game system in which a first and a second character each controlled by two players play by fighting in an object space (virtual three-dimensional space) are known.

In particular, in such game system, because the superiority or inferiority of each player's operation skill greatly affects the game results, and the operating steps for unleashing various techniques is generally complicated, this is one of the reasons why players who do not have confidence in their operational skills avoid playing this type of game.

Recently, in order to help players easily learn the operation steps for making a game character perform various actions, some games are replayed when the predetermined conditions are met during practicing the operations of the player in the practice mode (for example, Japanese Patent No. 3570813).

On the other hand, a game system is also known in which a target ranking is set according to the game progress in a racing game, and the target ranking is further updated when the target ranking is reached based on the player's operation (for example, JP-A-2001-276435).

SUMMARY OF INVENTION

Problem to be Solved by the Invention

However, in the game system described in U.S. Pat. No. 5,441,103, it is difficult to improve any player's operation skill when only replaying the games, because players such as beginners are often unable to find problems of their own operation skill even by watching replays of the games.

Further, in the game system described in JP-A-2001-276435, since the same target ranking (that is, the challenge) for all players is set, basically, it is useful of the game quality. However, it is difficult to find a challenge of each player's unique operational skill and to improve each player's individual operational skill.

The present invention is to provide a game system and the like, that enables any player including a beginner to easily find the challenge of the operation skill, to interest the game, and to easily practice to improve each of player's own operation skill.

Solution to Problem (1) In a game system according to a first aspect of the invention, there is provided the game system that performs a game using a player character that is controlled by player' instruction, having:
 an information management unit to manage, as task information, a task imposed by the player during playing the game according to a game identification status of a predetermined game, the task information be stored in a first memory unit;
 a reception process unit to accept a player's input operation;
 a game control unit to perform a game control process to control the progress of the game by controlling a player character according to an accepted player's input operation;
 a stop-playing control unit to perform a stop-playing process to stop-playing the game when accepting a given player's input operation during playing the game;
 a game status identification unit to identify a game status at the stop-playing timing that indicates a timing at which the game was stopped-playing by the stop-playing process or a game status up to the stop-playing timing;
 a task identification unit to identify the task information corresponding to an identified game status from among the task information stored in the first memory unit; and
 a presentation unit to perform a task presentation process to present, to player, as a task of the game subject to the stop-playing timing, a task in an identified task information.

(2) In a method for playing a game according to a second aspect of the invention, there is provided the method of playing a game using a player character that is controlled by player' instruction, having:
 managing, as task information, a task imposed by the player during playing the game according to a game identification status of a predetermined game, the task information be stored in a first memory unit;
 accepting a player's input operation;
 performing a game control process to control the progress of the game by controlling a player character according to an accepted player's input operation;
 performing a stop-playing process to stop-playing the game when accepting a given player's input operation during playing the game;
 identifying a game status at the stop-playing timing that indicates a timing at which the game was stopped-playing by the stop-playing process or a game status up to the stop-playing timing;
 identifying the task information corresponding to an identified game status from among the task information stored in the first memory unit; and
 performing a task presentation process to present, to player, as a task of the game subject to the stop-playing timing, a task in an identified task information.

(3) In a server system according to a third aspect of the invention, there is provided the server system that provides information of a game using a player character that is controlled by player' instruction to a terminal device, having:
 an information management unit to manage, as task information, a task imposed by the player during playing the game according to a game identification status of a predetermined game, the task information be stored in a first memory unit;

a reception process unit to accept a player's input operation;
a game control unit to perform a game control process to control the progress of the game by controlling a player character according to an accepted player's input operation;
a stop-playing control unit to perform a stop-playing process to stop-playing the game when accepting a given player's input operation during playing the game;
a game status identification unit to identify a game status at the stop-playing timing that indicates a timing at which the game was stopped-playing by the stop-playing process or a game status up to the stop-playing timing;
a task identification unit to identify the task information corresponding to an identified game status from among the task information stored in the first memory unit; and
a providing unit to perform a task presentation process to present, to the player, the task that is included in an identified task information, as the task of the game subject to the stop-playing timing, via the terminal device.

(4) In a method for providing information regarding a game according to a forth aspect of the invention, there is provided the method of providing, to a terminal device, information of a game using a player character that is controlled by player' instruction, having:
accepting a player's input operation;
managing, as task information, a task imposed by the player during playing the game according to a game identification status of a predetermined game, the task information be stored in a first memory unit;
accepting a player's input operation;
performing a game control process to control the progress of the game by controlling a player character according to a accepted player's input operation;
performing a stop-playing process to stop-playing the game when accepting a given player's input operation during playing the game;
identifying a game status at the stop-playing timing that indicates a timing at which the game was stopped-playing by the stop-playing process or a game status up to the stop-playing timing;
identifying the task information corresponding to an identified game status from among the task information stored in the first memory unit; and
performing a task presentation process to present, to player, as a task of the game subject to the stop-playing timing, a task in an identified task information.

BRIEF DESCRIPTION OF DRAWINGS

FIG. 4 is a diagram illustrating an example of task information stored in a memory unit in the embodiment of the present invention.
FIG. 5A is a diagram illustrating an example of game data in one embodiment of the present invention.
FIG. 5B is a diagram illustrating an example of game date in one embodiment of the present invention.
FIG. 6A is a diagram illustrating an example of game date in one embodiment of the present invention.
FIG. 6B is a diagram illustrating an example of game date in one embodiment of the present invention.
FIG. 9 is a diagram illustrating an example of task information stored in the memory unit when performing the task setting process based on a character in the embodiment of the present invention.

DESCRIPTION OF THE EMBODIMENTS

Figure 1:
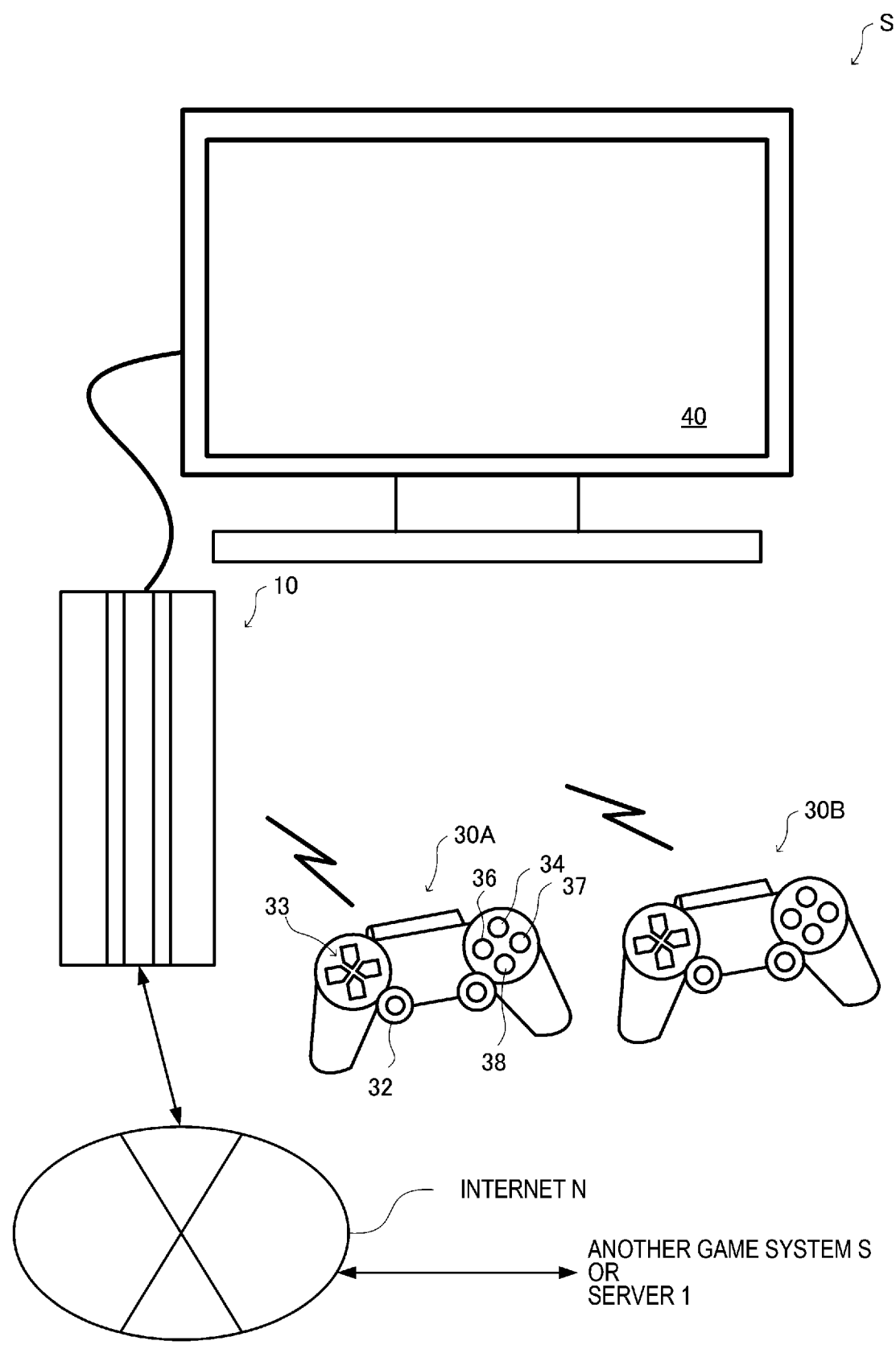
FIG. 1 is an example of a system configuration diagram illustrating a game system configuration according to one embodiment of the present invention.

According to an embodiment of the invention, there is provided a game system that plays a game using a player character that is controlled by player' instruction, having:
an information management unit to manage, as task information, a task imposed by the player during playing the game according to a game identification status of a predetermined game, the task information be stored in a first memory unit;
a reception process unit to accept a player's input operation;
a game control unit to perform a game control process to control the progress of the game by controlling a player character according to a accepted player's input operation;
a stop-playing control unit to perform a stop-playing process to stop-playing the game when accepting a given player's input operation during playing the game;
a game status identification unit to identify a game status at the stop-playing timing that indicates a timing at which the game was stopped-playing by the stop-playing process or a game status up to the stop-playing timing;
a task identification unit to identify the task information corresponding to an identified game status from among the task information stored in the first memory unit; and a presentation unit to perform a task presentation process to present, to player, as a task of the game subject to the stop-playing timing, a task in an identified task information.

Based on this configuration, the one embodiment of the present invention can present the game task according to the game operation skills by detecting the game operation skills.

Therefore, the one embodiment of the present invention can practice for each player to overcome the challenge in the game, and perform the game that matches the operational ability of each player, when performing the game according to the presented task.

Therefore, because the one embodiment of the present invention can allow any player including a beginner to easily find the challenge of the operation skill, the one embodiment of the present invention can easily practice to improve each of player's own operation skill, and allow any player to interest the game, regardless of the player's operation skill, when providing the game that reflects the challenge as described above.

The "game using a player character that is controlled by player' instruction" includes, for example, a multiplayer game, a sound game, a puzzle game, and a racing game using a player character or avatar.

For example, the "task imposed on the game" indicates a score, a number of kills (the number of enemy characters defeated in a multiplayer game), a task (such as collecting three specific items, reaching a set destination, or defeating a boss character), or conditions for clearing a game or each stage set in the game, such as time attack.

The "game control process" includes not only a control process in which a game is progressed based on operation control of a player character, but also control process in which another player characters are also controlled by instructions of another player, such as the multiplayer game, and control process in which another player character are controlled based on an automatic operations of NPC.

The recitation, "during the progress of a game" includes not only the "during the progress of a game" when performing the game control process, but also the "during the progress of a game" when performing a replay process to replay game play contents with the stored game data every perming the game control process.

For example, the "game status" includes:
(A1) the status of the game element to the game result and the temporal game element, such as a status of a game result of the player or player character, and the status of temporal elements of the stop-playing timing; and
(A2) a game element for construction the game space or for arranging a character in game space, such a position and parameter of each character including a player character and position, characteristic, and parameters of each object in the game space.

In particular, the "status of game elements to the game result and the status of temporal game elements" includes:
(B1) the result of the player or player character;
(B2) the achievement status of a predetermined game task based on the game result;
(B3) the operation error status, such as a type of an operation error of the player or player character (continuous attacks (combo) error, operation when a large number of points are lost or deducted, or error in obtaining a bonus), the number of the operation errors, or the timing at which the operation error occurred; and
(B4) the length of the term from the stop-playing timing to the end timing when the game progression is terminated.

For example, the "result" includes: a level; a ranking; a battle record (a winning rate, a number of wins, a number of losses, a number of kills in battle games), hit points (a number of attacks times and points given to enemy characters by attacks), a number of defeated enemy characters (a number of enemies shot down); a score, time (time to clear a mission or task, or time from start to goal or predetermined point); and earned rewards (items, points or in-game currency).

For example, A2 of the "game element for construction the game space or for arranging a character in game space" includes:
(C1) a parameter (for example, color information, a coordinate of the target to be reached in the case of a moving object, and final form in the case of an object undergoing change) that is set for each of characters including a player character, such as a position (a coordinate in the game space), motion (specifically, each of current coordinates of each parts of the character and a coordinate of final position of them after moving), a hit point (for example, a current point and a maximum point), an experience point and an ability score (including unlocked score after satisfying the predetermined condition, same as below);
(C2) a parameter related to an item including a type of an item, a number of items, and ability score of the item obtained by each of the characters and the player such as color information, a coordinate of the target to be reached in the case of a moving object, and final form in the case of an object undergoing change; and
(C3) a parameter related to an object in the game space, such as a type, a position, and characteristics of each of an object arranged in the game space.

The recitation, "identifying the game status at the stop-playing timing or the game status up to the time before the stop-playing timing" includes: in addition to the stop-playing timing; a predetermined timing such as the timing at which the game was started or the timing in a game played in the past; and the specified term from the predetermined timing to the stop-playing timing.

The "task presentation process" includes not only presenting a single task indicated by the specified task information to the player, but also presenting a plurality of tasks when the game status at or until the stop-playing timing matches the stored game identification status. In this case, a plurality of tasks may be uniformly presented, or the order of presentation may be determined according to a predetermined term.

(2) According to an embodiment of the invention, there may be provided the game system having:
a recording control unit to store, as a game data for a replay, data of the game when performing the game control process in a second memory; and
a replay process unit to replay the game by performing a replay process to read out the game data for the replay stored in the second memory and to replay game contents from a given timing according to the read out game data, wherein
the stop-playing control unit performs the stop-playing process to stop-playing the game during the replay process when accepting a given player's input operation during the replay process.
based on this configuration, the one embodiment of the present invention can present the task on the game according to the operation skill of each players when the player is reviewing a game played by the player in the past through the replay process, or when the player is referring to the game played by others.

For example, the "game data" includes:
(D1) data of an instruction of a player (instructions of each players when performing game by a plurality of players such as a multiplayer game);
(D2) control data defining a position (a coordinate in the game space, same as below), motion (each of positions of parts of the player character, that is, a coordinate in the game space, same as below) and status of a player character (or a plurality of player characters when the plurality of player characters is joined);
(D3) control data defining a position, motion and status of each of characters (including an enemy player character, for example) in game; and
(D4) control data defining a position, motion and status of each of objects which the game space has.

The "game data" may indicate a data group of time-series data from the start of the game to the end of the game, or also indicate a data group of time-series data of any one interval during the game.

Further, the "game data" may be game data of a retry game performed by a replay target game instruction control process, or game data of a game played by another player.

For example, the "given timing" includes a timing when a game starts, a timing during game such as a timing when a level or a stage of the game changes, and a timing indicated by the player.

The "replay process" simply indicates a process of reproducing past game contents by replaying game data of a past game like a video, and a process only for viewing by a player without player's instruction in real time.

Incidentally, the "replay process" may be performed by the game control process is performed based on the instruction data of the player as game data when using the instruction data of the player. Further, the "replay process" may be performed by controlling each of the character or each of the objects along with these control data or by combining the game control processing and the controlling each of the character or each of the objects.

(3) According to an embodiment of the invention, there may be provided the game system, wherein
the game status includes a length of term from the stop-playing timing to an end timing when a game progression is terminated,
the game status identification unit identifies the game status including the length of term,
the task identification unit identifies the task information from among a plurality of task information stored in the first memory unit according to an identified game status including the length of term.

Based on this configuration, the one embodiment of the present invention can set, for example: a task in which the player is not rewarded much but the difficulty of the player's operation is low, or a task that can be steadily accomplished over time, when the term from the stop-playing timing to the end timing in the replay process is long; and a task in which the player is rewarded much but the difficulty of the player's operation or a risk is high, when the term from the stop-playing timing to the end timing in the replay process is short.

Therefore, one embodiment of the present invention can present a task to player from various degrees of certainty even when referring to the same replay process, because the task can be varied when the stop-playing timing of the replay process in progress of the game is different.

As a result, one embodiment of the present invention can allow each of players to interest the game, because the player's operation abilities are improved from all angles.

(4) According to an embodiment of the invention, there may be provided the game system, further having
a timing setting unit to set, as a game instruction control process, a restart timing for restarting the game control process of a task setting target game that is a game used for setting the task according to the player's input operation, based on the identified stop-playing timing, wherein
the game status identification unit: identifies, as a game status at the restart timing, the game status at the stop-playing timing or the game status up to the stop-playing timing; and performs a determination process to determine given settings of the game according to the player's input operation for the task setting target game when starting the game control process, based on the identified game status, and
the game control unit performs, as a game instruction control process, the game control process from the restart timing based on the settings determined by the determination process and a accepted player's input operation.
based on this configuration, the one embodiment of the present invention can perform the game control process by restarting the game using when finding the task, while maintaining the game status that is the point to find the task.

Therefore, the one embodiment of the present invention can provide the game suitable for improving challenging manipulative skills by performing the game in which the task is reflected, the game suitable for improving the operational ability with the problem is played without reducing the player's interest in the game, when restarting the game in this way, The "restart timing" is preferable to be set according to the situation of the interruption timing, and may be an interruption timing.

In addition, the "restart timing" earlier than the shown below timing (a timing before an event) may be set as the switching timing, when the switching timing is a timing at which the motion of the player character cannot be changed after the interruption timing, a timing at which another event has already occurred, or a timing at which an event caused by the motion of the player character at the interruption timing occurs.

Further, when setting the term, "restart timing" before the stop-playing timing, the term includes a timing specified in advance by the player, a timing before a uniformly defined time from the stop-playing timing, or a timing predetermined in the game. Incidentally, as described above, when these timing are a timing at which the player cannot change the task after the stop-playing timing, a timing at which other events have already occurred, or a timing at which events resulting from the player character's actions at the stop-playing timing have already occurred, a timing prior to these timings (for example, a timing before the occurrence of the event) may be set as the restart timing.

The "restart timing" may be selected from among a plurality of timings, and be selected from among a plurality of timings (specified timing before entering the command, before performing the command and during performing the command) detected in the replay target game based on the player's instruction. In this case, options may be simply offered to the player, and offered to the player by displaying each of options as an image (for example, thumbnail display, or time-series and frame-by-frame display).

The recitation, "the determination process to determine given settings in a game when starting game control process to the task setting target game in response to the player's operation input based on specified game status" indicates to determine various settings to start (restart) the task setting target game in the state that is inherited the game status of the stop-playing timing.

The "settings" may be settings to faithfully reproduce the specified game status, or may be the settings not to faithfully reproduce the specified game status such as the settings excluding the predetermined settings that includes a hit point and time limit, and the setting having a part of the predetermined settings, or may be the settings having additional settings that includes a player's level and a number of items.

When the task is accomplished, a reward associated with the task may be given, or a reward may be given in accordance with the difficulty level associated with the task.

In particular, when determining the difficulty level associated with a task, the difficulty level may be determined based on the achievement status of the same task in other players. In this case, it is assumed that the achievement status of each player in the same task is tabulated in advance, the tabulated results may be hold in the game system or be used on the network.

The invention also covers the case where the tasks are further presented according to the achievement status of the determined task so as to set a new task (for example, Combo A+B, which is a more powerful attack than Combo A) when the set the task (for example, performing of Combo A) is completed.

(5) According to an embodiment of the invention, there may be provided the game system, wherein
the game status identification unit identifies, as the game status, the game status of an identification term, which includes the game status at the stop-playing timing, from a given timing to the stop-playing timing, and
the task identification unit identifies the task information corresponding to the game status of the identification term from among the plurality of task information stored in the first memory unit.

Based on this configuration, because the one embodiment of the present invention can set task based on the entire operation of a player, such as, for example, a identification term from the start of the game to the stop-playing timing, the one embodiment can set the task with reference to the operation during a certain term and, as a result, set the task more suitable for each of players.

(6) According to an embodiment of the invention, there may be provided the game system, wherein
the identification term includes the game status of the game when played the game in past.

Based on this configuration, because the one embodiment of the present invention can set, for example, task based on the player's input operation during the most recent week, the one embodiment of the present invention set the task with reference to the operation during a certain term and, as a result, set the task more suitable for each of players.

The "game in the case of being performed in the past" is, for example, the same game as the game subject to the task setting target game was performed in the past within a identification term (for example, during the most recent week), such as the game played last time or the game before the game played last time.

(7) According to an embodiment of the invention, there may be provided the game system, wherein
the game status includes a character status of a charter which appears in the game,
the task identification unit identifies, as the identified game status, the task information corresponding to the character status from among the plurality of task information stored in the first memory unit.

Based on this configuration, the one embodiment of the present invention can set the task based on, for example, attacks (that is, techniques) that the player has used a lot, abilities or characteristics (special moves) that the player character has, or attacks from enemies that the player is not good at (such as damaged techniques).

Therefore, the one embodiment of the present invention can set task more suitable for not only the player, but also the player character.

For example, the "character status" includes the various statuses of the character's type, abilities, level, characteristics, and items owned (type, number, abilities and characteristics of the item).

For example, the recitation, "identifying the task information associated with the character's status" indicates identifying a task that takes into account the player character's task, such as a task to be accomplished by an attack or special move that the player character is good at.

(8) According to an embodiment of the invention, there may be provided the game system, wherein
the game status identification unit identifies, as the game status, the game status of the game which is played by a plurality of players, and
the task identification unit identifies the task information corresponding to the game status of the game which is played by the identified plurality of players from among the plurality of task information stored in the first memory unit.

Based on this configuration, because the one embodiment of the present invention can set, for example, the task of a team or cooperative play, the one embodiment can easily practice for improving the operation ability of each of players in a group (team) match game, or in a game played by a plurality of players or in cooperative play.

The term "a game played by a plurality of players" means eliminating single-player game, and includes, for example, not only a multiplayer game in which a plurality of players (including computer players) plays against each other, and a multiplayer battle game, but also RPGs, racing games and shooting games in which the plurality of players plays.

For example, the "game status of a game played by a plurality of players" includes, in addition to or instead of the above game status:
(E1) a status determined based on the attributes, characteristics, and abilities of the player characters to be operated by each of players, such as the percentage of or the total number of player characters having specific attributes, characteristics, and abilities;
(E2) a status determined based on various parameters such as the level, experience point, and hit point of each of player characters, such as the percentage of or the total number of player characters having specific attributes, characteristics, and abilities; and
(E3) status determined based on the type, number, characteristics, and abilities of items possessed by each of player character, such as the percentage of or the total number of player characters with specific items (attributes, characteristics, abilities, and number of specific items).

Furthermore, the "task" in this case includes:
(F1) a task to be accomplished by a group having a plurality of players or player characters;
(F2) a task to be accomplished by an individual player character through cooperative play of the plurality of players or player characters; and
(F3) a task for each of players who controls a player character in a game played between the plurality of player characters.

(9) According to an embodiment of the invention, there may be provided the game system, wherein
the game status identification unit identifies, as the game status, the game status of a player who is selected by a given condition in the game which is played by a plurality of players, and
the task identification unit identifies the task information corresponding to the game status of the game which is played by the selected player from among the plurality of task information stored in the first memory unit.

Based on this configuration, because the one embodiment of the present invention can set, for example, the task of the player who has been eliminated or a bad result in a game played by the plurality of players, the one embodiment can easily practice to improve the operation ability of each of the players who have low operation ability and find it difficult to find tasks on their own such as a beginner, and can allow each of players to enhance the interest in the game by improving the operation ability of the players.

The "given conditions" include:
(G1) conditions whether or not the player is the player who controls the defeated player character in the multiplayer game; and
(G2) conditions whether or not the player operating the player character has a predetermined condition for the amount of damage received from the enemy character.

(10) According to an embodiment of the invention, there may be provided the game system, wherein
the presentation unit presents, to the player, information regarding the task with an identified task, as the task presentation process.

Based on this configuration, because the one embodiment of the present invention can recognize more clearly, the one embodiment of the present invention can allow each of players to interest the game by providing the game that has the task, and can allow each of players to practice seriously for improving the operation ability of each of players.

For example, "information regarding tasks" includes information such as:
(F1) information of the identified game status including a status at the stop-playing timing; and
(F2) information of the reason why the presented task was identified.

In particular, the reason why the presented task was identified is stored in the first memory unit in association with the corresponding task information, and is read out and presented when the task is identified.

(10) According to an embodiment of the invention, there is provided a program for performing a game using a player character that is controlled by player' instruction, the program causing a computer to function as:
an information management unit to manage, as task information, a task imposed by the player during playing the game according to a game identification status of a predetermined game, the task information be stored in a first memory unit;
an reception process unit to accept a player's input operation;
a game control unit to perform a game control process to control the progress of the game by controlling a player character according to a accepted player's input operation;
a stop-playing control unit to perform a stop-playing process to stop-playing the game when accepting a given player's input operation during playing the game;
a game status identification unit to identify a game status at the stop-playing timing that indicates a timing at which the game was stopped-playing by the stop-playing process or a game status up to the stop-playing timing;
a task identification unit to identify the task information corresponding to an identified game status from among the task information stored in the first memory unit; and
a presentation unit to perform a task present process to present, to player, as a task of the game subject to the stop-playing timing, a task in an identified task information.

Based on this configuration, the one embodiment of the present invention can present the game task according to the game operation skills by detecting the game operation skills. Therefore, the one embodiment of the present invention can practice for each player to overcome the challenge in the game, and perform the game that matches the operational ability of each player, when performing the game according to the presented task.

Therefore, because the one embodiment of the present invention can allow any player including a beginner to easily find the challenge of the operation skill, the one embodiment of the present invention can easily practice to improve each of player's own operation skill, and allow any player to interest the game, regardless of the player's operation skill, when providing the game that reflects the challenge as described above.

(12) According to an embodiment of the invention, there is provided a server system that provides information of a game using a player character that is controlled by player' instruction to a terminal device, having:
an information management unit to manage, as task information, a task imposed by the player during playing the game according to a game identification status of a predetermined game, the task information be stored in a first memory unit;
a reception process unit to accept a player's input operation;
a game control unit to perform a game control process to control the progress of the game by controlling a player character according to an accepted player's input operation;
a stop-playing control unit to perform a stop-playing process to stop-playing the game when accepting a given player's input operation during playing the game;
a game status identification unit to identify a game status at the stop-playing timing that indicates a timing at which the game was stopped-playing by the stop-playing process or a game status up to the stop-playing timing;
a task identification unit to identify the task information corresponding to an identified game status from among the task information stored in the first memory unit; and
a providing unit to perform a task presentation process to present, to the player, the task that is included in an identified task information, as the task of the game subject to the stop-playing timing, via the terminal device.

Based on this configuration, the one embodiment of the present invention can present the game task according to the game operation skills by detecting the game operation skills. Therefore, the one embodiment of the present invention can practice for each player to overcome the challenge in the game, and perform the game that matches the operational ability of each player, when performing the game according to the presented task.

Therefore, because the one embodiment of the present invention can allow any player including a beginner to easily find the challenge of the operation skill, the one embodiment of the present invention can easily practice to improve each of player's own operation skill, and allow any player to interest the game, regardless of the player's operation skill, when providing the game that reflects the challenge as described above.

(13) According to an embodiment of the invention, there is provided a program for providing a terminal device a game using a player character that is controlled by player' instruction, the program causing a computer to function as:
- an information management unit to manage, as task information, a task imposed by the player during playing the game according to a game identification status of a predetermined game, the task information be stored in a first memory unit;
- an reception process unit to accept a player's input operation;
- a game control unit to perform a game control process to control the progress of the game by controlling a player character according to a accepted player's input operation;
- a stop-playing control unit to perform a stop-playing process to stop-playing the game when accepting a given player's input operation during playing the game;
- a game status identification unit to identify a game status at the stop-playing timing that indicates a timing at which the game was stopped-playing by the stop-playing process or a game status up to the stop-playing timing;
- a task identification unit to identify the task information corresponding to an identified game status from among the task information stored in the first memory unit; and
- a providing unit to perform a task presentation process to present, to the player, the task that is included in an identified task information, as the task of the game subject to the stop-playing timing, via the terminal device.

Based on this configuration, the one embodiment of the present invention can present the game task according to the game operation skills by detecting the game operation skills. Therefore, the one embodiment of the present invention can practice for each player to overcome the challenge in the game, and perform the game that matches the operational ability of each player, when performing the game according to the presented task.

Therefore, because the one embodiment of the present invention can allow any player including a beginner to easily find the challenge of the operation skill, the one embodiment of the present invention can easily practice to improve each of player's own operation skill, and allow any player to interest the game, regardless of the player's operation skill, when providing the game that reflects the challenge as described above.

Hereinafter, embodiments of the present invention will be described. Note that the following embodiments do not unduly limit the scope of the invention as stated in the claims. In addition, all of the elements described in connection with the following embodiments should not necessarily be taken as essential requirements of the invention.

[1] Outline of the Game System

First, the outline and configuration of the game system S in the present embodiment will be described with reference FIG. 1. FIG. 1 is an example of a system configuration diagram illustrating configuration of the game system S according to the present embodiment.

The game system S according to the present embodiment is a game system that performs a battle game in which a first character controlled by a first player's input operation and a second character controlled by a second player's input operation compete against each other in a given game space (an object space).

Specifically, the game system S according to the present embodiment has: one or more controllers 30 operated by a player; a game main unit 10 that performs game process; and a display 40 that displays game images.

The game system S is configured to perform a battle game based on a game program or game data read from a memory, which is an information storage medium, or an operation signal input from the controller 30, in order to allow the players to enjoy playing the battle game while viewing a game screen displayed on the display 40.

For example, the game system S is configured to accept input operations based on the joystick 32, the cross key 33, and various buttons on the controller 30 operated by the player. The game system S is configured to control a player character based on the various game operations such as inputting types of techniques and timing for performing techniques. The game system S is configured to play against another player (a player who enters instruction to another controller 30B connected to the game system S or a player who operates another game system S connected via a network N), or against a character (NPC) controlled by the CPU.

In the present embodiment, information is transmitted and received between the controller 30 and the game main unit 10 through wireless communication. Instead, the controller 30 and the game main unit 10 may be connected by a communication cable, and information may be transmitted and received through the communication cable.

The main unit 10 performs the game process based on the instruction of the player (or a plurality of players when the plurality of controllers 30 are connected) via the controller 30, and based on process results, displays various game images on the display 40, and outputs various sound, such as BGM, form a speaker (not shown) during the game.

The controller 30 has: a joystick 32; cross keys 33; and a plurality of buttons 34, 36, 37 and 38 formed on the entire front surface.

For example, the right hand button 34 is an input unit for "right punch," the left hand button 36 is an input unit for "left punch," the right foot button 37 is an input unit for "right kick," and the left foot button 38 is an input unit for "left kick".

The controller 30 is also configured to recognize as a special operation instruction when inputting the player's input operation by a plurality of buttons simultaneously, or when inputting the player's input operation by a combination of the direction in which the cross key 33 is pressed down (including diagonal direction and neutral) and the buttons.

In addition to the above, the controller 30 has the plurality of buttons (not shown) on the sides and other parts.

Further, the controller 30 may also has a steering wheel, a microphone, a touch panel display, and an acceleration sensor.

[2] Game Main Unit

Figure 2:
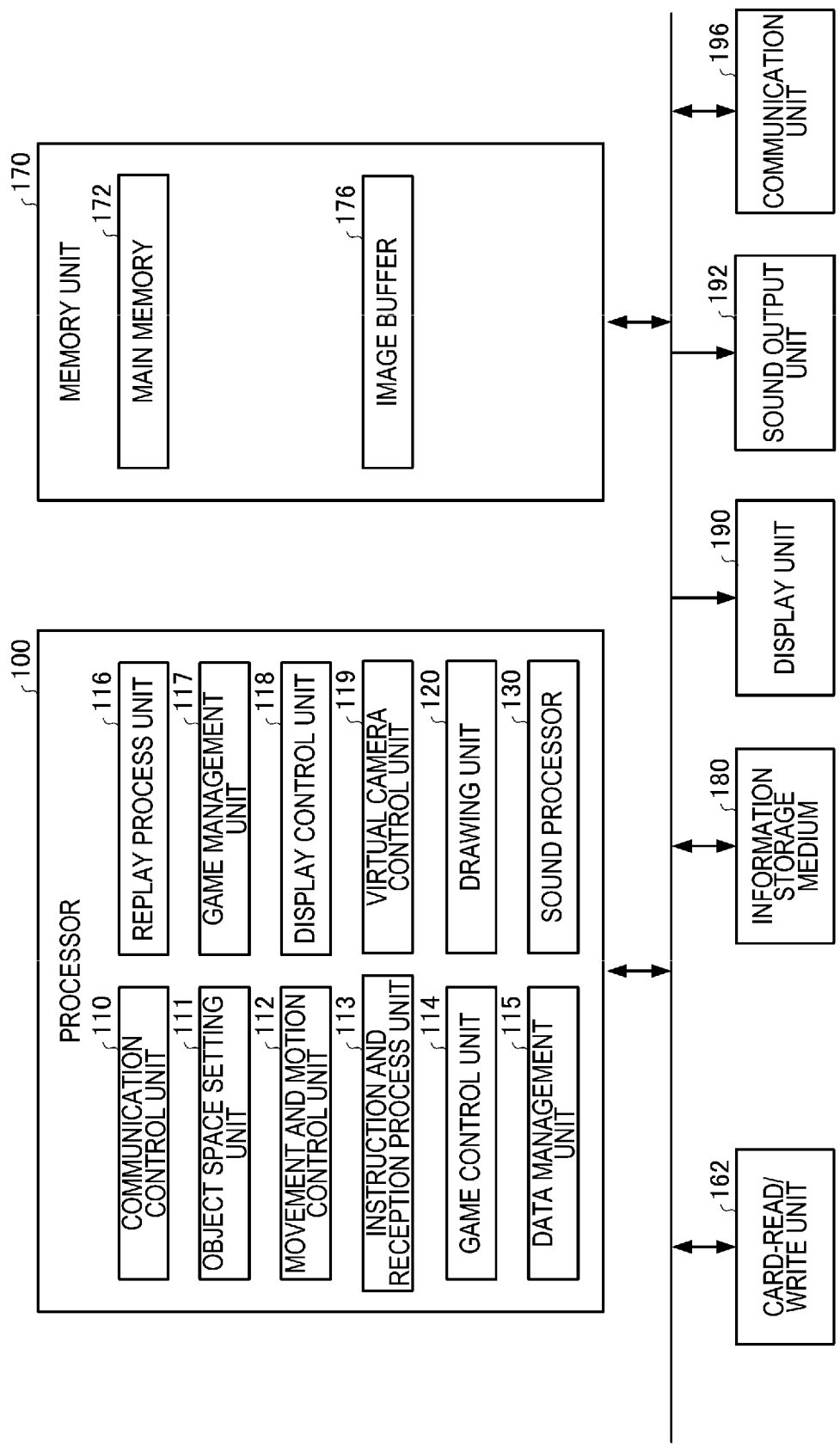
FIG. 2 is an example of a functional block diagram illustrating a game main unit according to one embodiment of the present invention.

Next, the configuration of the game main unit 10 of the present embodiment will be described with reference to FIG. 2. FIG. 2 is an example of a functional block diagram of the game main unit 10 according to the present embodiment. The game main unit 10 of the present embodiment may be configured by omitting one or more components shown in FIG. 2.

The card-read/write unit 162 reads data from the game card and writes the data to the game card, based on control of the processing section 100.

The memory unit 170 stores predefined programs and data and serves as a work area for the processor 100 and the communication unit 196 and the like. The memory unit 170 temporarily stores the calculation results performed by the processing section 100 in accordance with various programs and input data input from the controller 160. The function of the memory unit 170 can served by) and the like.

The memory unit 170 has a main memory 172 and an image buffer 176, and stores: a system program for realizing various functions to have the processing section 100 control the game system S in an integrated manner; a game program; various data; and the like, necessary to execute the multiplayer battle game, Specifically, in the memory unit 170, character setting data, stage setting data, and various data for setting of virtual camera (hereinafter referred to as the "virtual camera setting data") are stored For example, the necessary data for performing the processes of related to the progress of the game has the data, such as angle of view, viewing direction, and posture information for controlling the virtual camera, and count data for various time limits.

The character setting data has the base information that is necessary data to display and motion control of the characters, such as model data, texture data, and motion data of the characters used in the multiplayer game, in association with each character.

The stage setting data has information including model data, texture data and the like to form the stage, which is the stage to play the battle game in the three-dimensional virtual space, in association with each stage.

The virtual camera setting data has the standard setting of the virtual camera to image the game space. For example, the virtual camera setting data has the position of the virtual camera, angle of view, movement path, movement speed, rotation direction and speed, change of zoom and so on.

In the memory unit 170, in order to allow the player to view the contents of a past game as a replay, the instruction data, the various data or the both of the instruction data and the various data are stored, as game data for replaying in association with each game. The instruction data is a data of the player when the multiplayer battle game is performed by the player. The various data is a data performed by a process (hereinafter referred to as "game control process") to control the progress of the multiplayer battle game in response to the player's operation instruction.

In this embodiment, the game data for replay is used not only for replay, but also for identifying the game status of the game in replay (hereinafter referred to as "replay task setting target game"), for interrupting the process for replay (hereinafter referred to as "replay process"), and for performing the replay task setting target game (hereinafter referred to as a "retry game") based on the instruction of the player from a predetermined timing.

In the memory unit 170, as a task information is stored a task that is imposed on the player during performing the game provided to the player in association with a predetermined game identification status.

In the information storage medium 180 (a computer-readable medium), programs, data, and the like, are stored. The functions of the information storage medium 180 are implemented by hardware such as an optical disk (CD or DVD), magnetic disk (MO), magnetic disc, hard disc, magnetic tape, or memory (ROM).

In the information storage medium 180, a program for causing a computer to function as each unit of the present embodiment (a program for causing the computer to perform the process of each unit) can be stored.

In the memory unit 180, the system program for realizing various functions to have the processor 100 control the game system S in an integrated manner, the game program necessary to perform the multiplayer battle game, various data and the like, may be stored similar to the memory unit 170, instead of the memory unit 170, or together with the memory unit 170.

A display unit 190 displays a given image. The function of the display unit 190 can be implemented by a CRT, an LCD, a touch panel type display, or an HMD (head mounted display) and so on. The display unit 190 serves as the display 40 in FIG. 1.

A sound output unit 192 outputs a sound that is generated by the present embodiment. The function of the sound output unit 192 can be implemented by a speaker, a headphone and the like.

A communication unit 196 performs the various control to communicate with an external device (for example, a terminal, such as other game system S or a communication terminal including a smartphone, a server 1 and so on) via a network N. The functions of the communication unit 196 can be implemented by hardware of various processors or ASICs for communication, program and so on.

The programs and the data for making the computer function as the units of the present embodiment that are stored in the information storage medium 180 or memory unit 170 of the server device 1 may be received via the network, and be stored in the information storage medium 180 or memory unit 170. The case in which the terminal is made to function by receiving the program or data in this manner is also included within the scope of the present invention.

The communication unit 196 executes various controls for communication (for example, Near Field Communication) with one or more controllers 30.

The communication unit 196 includes an antenna and a wireless module, and transmits and receives the data with the one or more controllers 30 using, for example, Bluetooth (Registered Trademark) technology.

For example, the communication unit 196 transmits sound data, such as confirmation and sound effect sounds, and vibration signals to the controller 30, and receives information (acceleration vector values, etc.) detected by acceleration sensors and input operations at the controller 30 at alternating intervals of 4 msec and 6 msec.

The processor 100 performs processing game process, image generation process, sound generation process, and so on, based on input data and programs from the controller 30 or the card-read/write unit 162.

In particular, the processor 100 performs various processes using the main memory 172 in the memory unit 170 as a work area Further, the processor 100 is implemented by hardware such as various processors (CPU, DSP, etc.), ASICs (gate arrays, etc.), and programs, and performs various functions.

The processor 100 is configured to perform the various processes of the present embodiment or the various functions for the battle games based on programs (data) stored in the memory unit 170 or information storage medium 180.

Specifically, the processor 100 includes a communication control unit 110, an object space setting unit 111, a movement and motion control unit 112, an instruction and reception process unit 113, a game control unit 114, a data management unit 115, a replay process unit 116, a game management unit 117, a display control unit 118, a virtual camera control unit 119, drawing unit 120, and sound process unit 130. One or more of these units may be omitted from the configuration.

The communication control unit 110 processes data transmission and reception via a network with the server device 1 and terminal devices such as other game systems.

Specifically, the communication control unit 110 performs processes for receiving various information transmitted from the server device 1 and other terminal devices and for transmitting the information to the server device 1 and other terminal devices when playing the multiplayer game based on information received from the server device 1 or when playing against other players via a network.

In the game system S of the present embodiment, the communication control unit 110 acquires the network information required for communication control from the server 1 and manages the communication control.

For example, the game system S may acquire identification information for terminal devices (data or ID that is individually assigned to identify terminals in order to participate in online games) that is individually assigned to each game system S, and destination information that specifies the destination of packet transmission (such as IP address) that is associated with the identification information of each game system S. Further, the game system S may manage the identification information for terminal devices and the destination information.

Specifically, the communication control unit 110 performs: a process that generates the packets to be sent to other terminal devices or server devices 1; a process that specifies the IP address and the port number of the packet transmission destination terminal device or server device 1; a process that stores data contained in received packets in the memory unit 170, a process that analyzes received the packets; and other control processes related to the transmission and reception of packets.

The communication control unit 110 transmits and receives the data to and from a plurality of other game systems S or the server device 1 in a predetermined cycle (for example, one second cycle) from the time a communication connection that is established until the communication connection is terminated.

In the case of a network system including the terminal devices of the plurality of game systems S, the communication control unit 110 may execute communication control using the peer-to-peer (so-called P2P) method, in which online games are executed while transmitting and receiving data between a plurality of terminal devices. In the case of a network system including a plurality of terminal devices, communication control unit 110 may execute communication control using the client-server method, in which each terminal device executes an online game while sending and receiving data (information) via the server device 1.

In the network system of the present embodiment, the data may be transmitted and received not only by wired communication but also by wireless communication.

The communication control unit 110 performs the process of acquiring input information from the controller 30. For example, the communication control unit 110 receives the various instructions of each of players for the game, such as instructions for controlling the player characters and the replay instructions.

The object space setting unit 111 performs process of arranging an object in an object space (virtual three-dimensional space). For example, the object space setting unit 111 performs process of make a game space (for example, a stage for the charters to battle) in the virtual three-dimensional space. The object space setting unit 111 performs process of arranging a display object such as a building, a baseball park, a car, a tree, a pillar, a wall, and a map (landform) in the object space. Here, the object space is a virtual game space. For example, in the case of a virtual three-dimensional space, the object is arranged in a three-dimensional coordinate system (X, Y, Z), such as a world coordinate system or a virtual camera coordinate system.

For example, the object space setting unit 111 arranges the object (an object that is composed of primitives such as a polygon, a free-form surface, or a sub-division surface) in the world coordinate system. For example, object space setting unit 111 determines a position and a rotation angle (synonym of orientation and direction) of the object in the world coordinate system and arranges the object at the rotation angle (rotation angle around the X, Y, and Z axes) in the position (X, Y, and Z).

The object space setting unit 111 may perform a process of arranging an instruction object, such as an input instruction object and a marker of the special command on a screen (two-dimensional image, screen, screen coordinate system). The object space setting unit 111 may arrange the instruction object in the object space (the three-dimensional space, the world coordinate system, the virtual camera coordinate system, and the model coordinate system).

The movement and motion processor 112 performs calculation of movement and operation of the object in the object space. Namely, the movement and motion processor 112 performs the process of moving the object in the object space, and the process of operating the object (motion or animation), based on the input information, the program (movement and motion algorithm), or the various data (motion data) from the controller 160.

The movement and motion processor 112 controls the behavior of character objects (characters), which are major objects, in the object space.

Specifically, the movement/motion processor 112 performs: a process of controlling the movements of the characters of the player and the opponent based on operation codes of input operation from controller 160 and obtained from the opponent's game system S, and selection instruction data; a process of displaying effects when certain conditions are met; a process of hit judgments for attack techniques; the process of damage based on the process of the hit judgments; and so on.

The movement and motion processor 112 performs these processes every frame (for example, 1/60 second). The frame is the unit of time in which the object movement and action process and image generation process are performed.

The instruction and reception process unit 113 performs recognition process of instruction commands based on input information input to the controller 160 by the player.

Specifically, the instruction and reception process unit 113 in the present embodiment recognizes instruction commands input by the player, based on the type of button, a number of button presses, the direction of a lever indication, the timing of button pressing down and a lever indication timing, and combinations of these input by the input unit 260.

For example, the instruction and reception process unit 113 accepts the instruction as "right punch" when detecting a press-down of the right hand button 34, and accepts an instruction as "left punch" when detecting a press-down of the left hand button 36.

For example, the instruction and reception process unit 113 accepts the instruction as "right kick" when detecting a press-down of the right kick button 37, and accepts an instruction as "left kick" when detecting a press-down of the left kick button 38.

The instruction and reception process unit 113 recognizes as a special instruction when inputting the player's input operation by a plurality of buttons simultaneously, or when inputting the player's input operation by a combination of an inclination angle the joystick 32 and each of the buttons.

For example, when detecting the operation of tilting the joystick 32 in the direction in which the player character moves forward in combination with the input of the buttons, the instruction and reception process unit 113 accepts the instruction of various attack actions of the player character.

For example, when detecting the operation of tilting the joystick 32 in the direction in which the player character moves backward in combination with the input of the buttons, the instruction and reception process unit 113 accepts the instruction of various defense actions of the player character.

The instruction and reception process unit 113 is designed to be able to accept the player's input operation for enhancing realism. For example, the instruction and reception process unit 113 accepts the instruction to allow the player character to perform a special motion after the player character moves left hand, right hand, left hand, right hand of the player character (in addition to the player character walks in the right direction), when detecting the pressing down of the buttons in the order of left hand button 36, right hand button 34, left hand button 36, right hand button 34 (in addition to detecting the tilting of joystick 32 in the right direction).

The instruction and reception process unit 113 accepts the player's input operation for continuous movement of the player character. For example, the instruction and reception process unit 113 accepts the instruction to allow the player character to perform a left kick after a jab with the left hand when detecting the pressing down of the right kick button 37 immediately, after pressing the left hand button 36.

The instruction and reception process unit 113 may receive the instruction commands recognized by the controller 160.

The game control unit 114 performs a process related to the progress of the multiplayer battle game. For example, the process related to the progress of the multiplayer battle game includes: the process of starting a game when the game start conditions are met (hereinafter also referred to as "game start process"); the game control process to control the progress of the multiplayer battle game by controlling the player character in response to the player's operation instruction; the game end process to terminate the game when the game end condition is met (hereinafter also referred to as "game end process"); and the process to control the progress of an ending part of the game when the final stage is completed.

The game control unit 114 performs the game control process of the replay task setting target game (Hereinafter also referred to as a "replay task setting target game instruction control process") in response to the player's instruction based on the player's operation, when performing the replay process based on the game data for replay that has already been executed as the game and stored in the memory unit 170.

The data management unit 115 stores, to the memory unit 170, as game data for replay (hereinafter referred to as a "replay data") for each game: the data of the player's instructions (for example, instruction data) when performing the game control process to control the progress of the game by controlling the player character in response to the player's input operation; and various data executed by the game control process (hereinafter referred to as "game control data"); or both of these data.

The data management unit 115 manages the task information stored in the memory unit 170. In particular, the data management unit 115 provides the stored task information to the game management unit 117 when performing a process for setting task for a game (hereinafter referred to as "task setting process").

The data management unit 115 provides the stored replay data to the replay process unit 116 when performing the replay process based on the replay data stored in the memory unit 170.

The data management unit 115 may store, in the memory unit 170, the instruction data, game control data of the retry data during performing the replay game in response to the reply target game.

The replay process unit 116 reads the replay data stored in the memory unit 170 via the data management unit 115. The replay process unit 116 performs the replay process to replay the contents of the game play in the replay task setting target game from a given timing, such as the game start timing or the timing during the game indicated by the player, according to the read replay data.

The game management unit 117 performs the task setting process to set task for the game during the progress of the game, such as during the performing the game (that is, during performing the game control process) or during the replay process.

The retry game management unit 117 performs various settings for the game control process (for example, the replay target game instruction control process) from a given timing, as the retry game, based on the player's input operation with the game status of the replay task setting target game being replayed.

Display control unit 118 controls the display of display objects displayed on the display unit 190.

Specifically, the display control unit 118 generates the display objects (game characters, backgrounds, targets, vehicles, balls, items, buildings, trees, pillars, walls, maps), indicates the display positions of display objects, disappearing the display objects, and performs other display control.

In other words, the display control unit 118 registers the generated display objects in the display object list, transfers the display object list to the drawing unit 120, deletes the disappeared display objects from the display object list, and performs other display controls.

The display control unit 118 performs animation process to move and operate the game characters such as player characters.

The animation process is a process to move the game characters (display objects defined by 2D or 3D data) in the game field (2D or 3D game space).

Specifically, the display control unit 118 performs animation process to move the display objects based on the input data, programs (movement algorithms) and various data, input by the player.

For example, the display control unit 118 sequentially calculates the movement information (position, rotation angle, speed, or acceleration) of the displayed object every frame (1/60 second).

On the other hand, the display control unit 118 performs the display control process, which is one of processes to present the task to player, to display the task set by the task setting process to the player, as the task of the target game.

The virtual camera control unit 119 performs a control process of a virtual camera (viewpoint) to generate an image seen from a given (arbitrary) viewpoint in the object space.

Specifically, in the case of generating a three-dimensional image, the virtual camera control unit 119 performs a process to control the position (X, Y, Z) and rotation angle (for example, a rotation angle in the case of clockwise rotation in terms of the positive direction of each of the X, Y and Z axes) of the virtual camera in the world coordinate system.

In other words, the virtual camera control unit 119 performs the process to control at least one of the viewpoint position, the viewing direction, the angle of view, the movement direction, and the movement speed of the virtual camera.

The drawing unit 120 performs a drawing process based on the results of various processes performed by the processor 100, generates images by drawing process, and outputs the image to the display section 190.

In other words, the drawing unit 120 generates the images visible from the virtual camera in the object space.

For example, the drawing unit 120 receives object data (model data) including vertex data (vertex position coordinates, texture coordinates, color data, normal vector or alpha value, etc.) for each vertex of an object (model), and based on the vertex data included in the input object data, performs vertex processing (vertex shader processing). A vertex generation process (tessellation, surface division, polygon division) may be performed in order to re-divide polygons as necessary when the vertex processing is performed.

In vertex processing, the drawing unit 120 performs geometry processing, such as vertices movement process, coordinate transformation (for example, world coordinate transformation), field of view transformation (camera coordinate transformation), clipping process, fluoroscopy transformation (projection transformation), and viewport transformation, in accordance with the vertex processing program (vertex shader program or the first shader program).

The drawing unit 120 performs rasterization (scan conversion) based on the vertex data after the vertices processing and associates the plane of the polygon (primitive) with the pixel. The drawing unit 120 performs the pixel processing (shading by pixel shaders and fragment processing) for drawing the pixels (fragments constituting the display screen image) constituting the image after the rasterization.

In pixel processing, the drawing unit 120 determines the final drawing color of the pixel constituting the image, by performing various processes such as reading the texture (texture mapping), setting/changing the color data, translucent compositing, and anti-aliasing in accordance with the pixel processing program (pixel shader program or the second shader program). The drawing unit 120 outputs (draws) the drawing color of the object converted into a fluoroscopy to the image buffer 176 (a buffer capable of storing image information in pixels. VRAM or rendering target).

In other words, in the pixel processing, the drawing unit 120 performs the per-pixel processing for setting or changing image information (color, normal line, brightness, and a value) in pixel units. Therefore, the drawing unit 120 generates the images visible from the virtual camera in the object space.

The vertices processing and the pixel processing are implemented by the hardware, the so-called programmable shaders (for example, the vertices shaders and the pixel shaders), that makes the polygon (primitive) drawing processing programmable by the shading program written in the shading language.

The programmable shader has high degrees of freedom of the content of the drawing process since the process at the vertices and the process at the pixels are programmable. Therefore, the expressiveness can be significantly improved compared to the fixed drawing processing using conventional hardware.

When drawing an object, the drawing unit 120 performs geometry processing, texture mapping, hidden surface erasing processing, and a blending.

The drawing unit 120 performs processes in the geometry processing, such as coordinate transformation, clipping processing, perspective projection conversion, light source calculation. The drawing unit 120 stores the object data (the position coordinate of the object's vertex, texture coordinate, color data (brightness data), normal line vector, or a value) after the geometry processing (after the perspective projection conversion) in the memory unit 170.

Texture mapping is a process for mapping a texture (a texture value) stored in the memory unit 170 to an object.

Specifically, the drawing unit 120 reads out the texture (a surface property such as color (RGB) and an $\alpha$ value) from the memory unit 170 using the texture coordinate set (provided) to the vertices of the object. The drawing unit 120 maps a texture that is a two-dimensional image to an object. In this case, the drawing unit 120 performs the process of matching pixels and tech cells, and bilinear interpolation as the interpolation of tech cells, and the like.

As the hidden surface removal process, the drawing unit 120 performs a hidden surface removal process according to Z-buffering (a depth comparison method, a Z test) using a Z-buffer (a depth buffer) in which a Z-value (depth information) of a drawing pixel is stored.

Namely, when drawing a drawing pixel corresponding to the primitive of an object, the drawing unit 120 refers to the Z value stored in the Z buffer. The drawing unit 120 compares the Z value of the referenced Z buffer with the Z value in the drawing pixel of the primitive. When the Z value in the drawing pixel is a Z value (for example, a smaller Z value) on the front side as viewed from the virtual camera, the drawing unit 120 performs drawing process of the drawing pixel and updates the Z value of the Z buffer to a new Z value.

The $\alpha$ blending ($\alpha$ compositing) refers to a translucent compositing process (straight $\alpha$ blending, additive $\alpha$ blending, or subtractive $\alpha$ blending) based on an $\alpha$ value (an A value).

For example, in $\alpha$ blending, the drawing unit 120 performs a linear compositing process based in the $\alpha$ value of a drawing color (a color to overwrite with) C1 to be drawn in the image buffer 176 and a drawing color (a basic color) C2 already drawn in the image buffer 176 (rendering target). In other words, when C denotes a final drawing color, the drawing unit 120 performs can obtain C according to $C=C1*\alpha+C2*(1-\alpha)$.

It should be noted that the $\alpha$ value is information that can be stored in association with each pixel (texel and dot) and is, for example, additional information other than color information. The $\alpha$ value can be used as mask information, translucent compositing process (equivalent to transparency and opacity), bump information, and the like.

In the case of a multi-player online game in which data is sent and received via a network with another terminal (a second terminal), the drawing unit 120 performs a process of generating an image from a virtual camera (a virtual camera controlled by the terminal (first terminal)) that follows the movement of the object of the operation target of the terminal (first terminal). In other words, each terminal performs independent drawing processing.

The sound controller 130 performs the sound process based on the results of various processes performed by the processor 100, generates a game sound, such as a BGM, an effect sound, or a voice, and outputs the image to the display section 192.

The terminal of the present embodiment may be controlled to allow game play in single player mode, in which only one player can play, or in multi-player mode, in which multiple players can play. For example, when controlling in multi-player mode, the game process may be performed by sending and receiving the data to and from other terminals via a network, or a single terminal may perform the processing based on input information from multiple inputs.

[3] Method of the Present Embodiment

[3.1] Overview

Next, the method and overview of the task setting process to set tasks for a game in progress and the task presentation process to present the tasks to the player are described with reference to FIG. 3.

Figure 3:
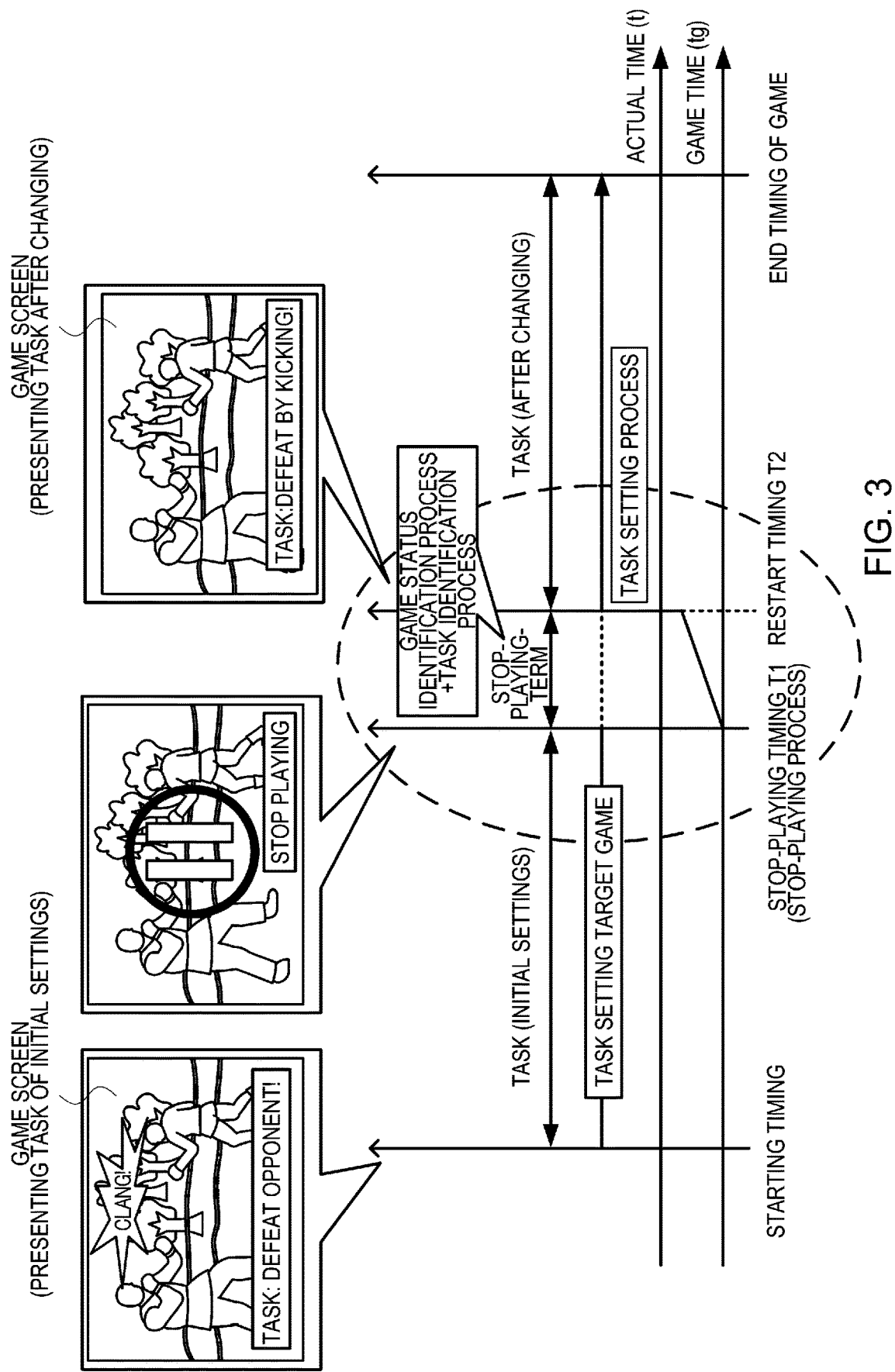
FIG. 3 is a diagram for explaining the task setting process to set tasks for a game in progress and the task presentation process to present the tasks to the player in one embodiment of the present invention.

FIG. 3 is a diagram for explaining the task setting process to set tasks for a game in progress and the task presentation process in the present embodiment.

The game system S of the present embodiment performs the multiplayer battle game in which the player character (which may be an avatar) is operated and controlled by the player. The game system S is a game system to set the task of the player to the game based on the game status at the timing when the game was stopped-playing (hereinafter referred to as the "stop play timing") or the game status up to the time before the stop-playing timing, when the game is stopped by the player during performing the multiplayer battle game or during the replay of the multiplayer battle game played in the past.

The game system S of the present embodiment is configured to be able to easily find the task by any player including a beginner in operating ability, and to present the found task to the player and to provide the game reflecting the task.

Specifically, the game system S is configured to perform the reception process to manage the task imposed on the player during the progress of the game, as the task information, associated with the game identification status of the predetermined game, and to accept the player's input operation. Further, the game system S is configured to perform the game control process to control the progress of the game by controlling the player character.

As illustrated in FIG. 3, the game system S is configured to perform:

(A1) a stop-playing process to stop-playing the game when a given input operation is received from the player during the progress of the game;

(A2) a game status identification process to identify the game status at the stop-playing timing indicating the timing at which the game is stopped-playing by the stop-playing processing, or the game status up to the stop-playing timing; and (A3) a task identification process to identify the task information corresponding to the identified game status from among the stored task information. Further, by performing these process, the game system S is configured to perform a task setting process to set the identified task (the task indicated by the identified task information) by performing as the task of game (hereinafter also referred to as "task setting target game", or in the case of the replay game, as "the replay task setting target game") that is stopping at the stop-playing timing.

The game system S is configured to perform a task presentation process to present the task set by the above task setting process to the player, as the task of game that is stopping at the stop-playing timing.

FIG. 3 is a diagram illustrating an example, in a game (that is, the task setting target game) in which a task of an initial setting sets until the stop-playing timing T1, when pausing the game by performing the stop-playing process at the stop-playing timing T1, setting and presenting a new task (to defeat by kicking) by performing the game status identification process and task identification process during the stop-playing term; and restarting the game from the restart timing T2 after setting the new task.

Specifically, FIG. 3 shows that when the new task is set, the task setting target game starts from a predetermined timing (hereinafter referred to as "restart timing").

In the present embodiment, although the restart timing is different from the stop-playing timing on the actual time (actual time axis), the restart timing is the same as the stop-playing timing on the game time (game time axis). Incidentally, as will be described later, the restart timing may be different from the stop-playing timing on the game time.

The game system S of the present embodiment can present the game task according to the game operation skills by detecting the game operation skills. Therefore, the game system S can practice for each player to overcome the challenge in the game, and perform the game that matches the operational ability of each player, when performing the game according to the presented task.

Therefore, because the game system S of the present embodiment can allow any player including a beginner to easily find the challenge of the operation skill, the game system S can easily practice to improve each of player's own operation skill, and allow any player to interest the game, regardless of the player's operation skill, when providing the game that reflects the challenge as described above.

Further, when stopping the progress of the multiplayer battle game, which performed already in the past, by the player during the replay of the game, the game system S of the present embodiment enables to perform the game (that is, retry game) by identifying the task of the game (that is, the replay task setting target game) in the replay, setting the identified task to the replay task setting target game, and accepting a new player's input operation in the replay task setting target game.

[3.2] Task, Game Status (Game Identification Status) and Task Information

Next, the task, game status (game identification status) and task Information of the present embodiment will be described with reference to FIG. 4. FIG. 4 is a diagram illustrating an example of task information stored in memory unit 170 of the present invention.

The task information is information stored in the memory 170 and is used to set tasks for the player to clear the game or to clear the stages of the game during the progress of the game.

Specifically, the task of the present embodiment is a score, a number of kills (the number of enemy characters defeated in a multiplayer game), a task (such as collecting three specific items, reaching a set destination, or defeating a boss character), or conditions for clearing a game or each stage set in the game, such as time attack.

The task information is game status that changes with the progress of the game, and each of the above-mentioned tasks is set in correspondence with a predetermined game identification status (that is, game-specific status).

For example, the game status including the game identification status includes:
(A1) the status of the game element to the game result and the temporal game element, such as a status of a game result of the player or player character, and the status of temporal elements of the stop-playing timing; and
(A2) a game element for construction the game space or for arranging a character in game space, such a position and parameter of each character including a player character and position, characteristic, and parameters of each object in the game space.

In particular, the statuses of game elements to the game result and the statuses of temporal game elements of (A1) includes:
(B1) the result of the player or player character;
(B2) the achievement status of a predetermined game task based on the game result;
(B3) the operation error status, such as a type of an operation error of the player or player character (continuous attacks (combo) error, operation when a large number of points are lost or deducted, or error in obtaining a bonus), the number of the operation errors, or the timing at which the operation error occurred; and
(B4) the length of the term from the stop-playing timing to the end timing when the game progression is terminated.

For example, the "result" includes: a level; a ranking; a battle record (a winning rate; a number of wins; a number of losses; a number of kills in battle games); hit points (a number of attacks times and points given to enemy characters by attacks); a number of defeated enemy characters (a number of enemies shot down); a score; time (time to clear a mission or task; or time from start to goal or predetermined point); and earned rewards (items, points or in-game currency).

The "game element for construction the game space or for arranging a character in game space" of (A2) includes:
(C1) a parameter (for example, color information, a coordinate of the target to be reached in the case of a moving object, and final form in the case of an object undergoing change) that is set for each of characters including a player character, such as: a position (a coordinate in the game space); motion (specifically, each of current coordinates of each parts of the character and a coordinate of final position of them after moving); a hit point (for example, a current point and a maximum point); an experience point; and an ability score (including unlocked score after satisfying the predetermined condition, same as below);
(C2) a parameter related to an item including a type of an item, a number of items, and ability score of the item obtained by each of the characters and the player such as color information, a coordinate of the target to be reached in the case of a moving object, and final form in the case of an object undergoing change; and
(C3) a parameter related to an object in the game space, such as a type, a position, and characteristics of each of an object arranged in the game space.

As shown FIG. 4, the task information defines the task for each game identification status.

FIG. 4 is a diagram illustrating the example of the task information having a number of enemy characters to defeat (including boss characters) for each level game range, when defeating a plurality of enemy characters, and when the game level is a level at the player's stop timing as a game identification status.

[3.3] Game Control Process and Replay Process Using Game Data (Replay Data)

Next, the game control process and the replay process using the game data (replay data) of the present embodiment will be described with reference to FIGS. 5 and 6. FIGS. 5 and 6 show examples of the game data (replay data).

(Game Control Process)

The game control unit 114 basically executes operation control of the player character based on the operation instruction data received by the operation input reception processing unit 113, and progress the game based on various program data.

The game control unit 114 performs not only a control process to progress the game based on operation control of a player character, but also: a control process of the multiplayer game in which another player characters are also controlled by instructions of another player; a control process to control other player characters based on automatic operations of NPCs; and a control process to control the game space and each object that appears in the game space.

(Game Data and Replay Data)

The game data of the present embodiment is mainly data used when performing the replay process, and data related to the game when performing the game control process to control the progress of the game by controlling the player character in response to the player's input operation.

The game data of the present embodiment is not only a data to control the player character, but also a data to control other player characters such as the NPC.

For example, as shown in FIGS. 5A and 5(B), the game data is:
(A1) the data (hereinafter referred to as an "instruction data" of the player's input operations output from the controller 30 accepted by the instruction and reception process unit 113 (the input operations of each player when the game is played by the plurality of players in the multiplayer game).
(A2) the control data to define the position (coordinates in the game space, the same hereinafter), motion (specifically, the position of each part of the player character and its coordinates in the game space, the same hereinafter), the status (that is, the current status and remaining amount of physical strength and life energy, the current value and remaining amount of parameters used when performing techniques, whether or not the player character is invincible or in a power-up state, or whether or not certain actions are restricted, such as being blocked from attacking) of the player character (or the plurality of player characters when the plurality of players participates in the game; the same hereinafter) including NPCs;

(A3) control data to specify the position, the motion and the status of each character appearing in the game (including, for example, enemy player characters).

(A4) control data to specify the position, the motion and the status of each object constituting the game space, such as a stage on which a game such as a battle is played, a course on which a race is run, or an object space for RPGs;

(A5) the combination of two or more of (A1)-(A4).

Although the game data is preferably the data group of time-series data from the start of the game to the end of the game, the game data may indicates the data group of time-series data of any one interval during the game.

Further, the game data may be game data of a retry game performed by a replay task setting target game instruction control process, or game data of a game played by another player.

FIG. 5A shows an example of the instruction data (the cross key directions and combinations of the right hand button, the left hand button, the right foot button and the left foot button) of player A and player B from the start of the game (0 seconds) as the game data.

FIG. 5B shows an example of the control data of the position coordinates, the motion and the status of the player characters of player A and player B from the start of the game (0 seconds) as the game data.

The replay data is the game data stored in memory unit 170 for replay, and as shown in FIGS. 5A and 5(b), the game data that has the various types of information, such as identification information about the game (game ID), identification information about the player (player ID), and information about the date and time when the game was performed.

FIG. 6A shows an example of the instruction data (the cross key directions and combinations of the right hand button, the left hand button, the right foot button and the left foot button) of player A having the player ID "101" and player B of the CPU player from the start of the game (0 seconds) as the game data that is performed in Sep. 10, 2020 using game ID "001."

FIG. 6B shows an example of the control data of the position coordinates, the motion and the status of the player characters of player A and player B of the CPU player from the start of the game (0 seconds) as the game data that is performed in Sep. 14, 2020 using game ID "001."

(Replay Process)

The replay process unit 116 reads the various game data as described above stored in the memory unit 170, and performs the replay process to replay the play contents of the replay task setting target game from the given timing such as the timing at which the game has started (hereinafter referred to as the "game start timing"), in accordance with the read game data.

In other words, the replay process unit 116 is configured to simply perform the process of reproducing the past game contents based on the game data like the animation (video), and the process to view by the player without player's operation input of a player in real time.

Specifically, the replay process unit 116 displays the play contents of the replay task setting target game on the display 40 (display 190) by animation, and allow the player to view the play contents of the game.

Further, when using the player's instruction data as game data, the replay process unit 116 controls the game control unit 114, performs the game control process based on the game data, works in conjunction with the display control unit 118, virtual camera control unit 119 and drawing unit 120, and displays the result of the process on the display 40 as an animation.

When the control data is used as game data, the replay process unit 116 controls each character including the player character and each object, in accordance with such control data, and displays the results of the control of the player character and other objects on the display 40 as an animation.

When both of the player's instruction data and the control data are used as game data, the replay process unit 116 performs the game control process to control the player character based on the instruction data regarding important parts of the game, such as battle scenes. Further, the replay process unit 116 controls the motion of the player character and other characters or objects according to the control data, integrates the motion and changes of each character or object including the controlled player character, and displays as an animation on the display 40.

The replay process unit 116 may perform the replay process from a given timing, as a given timing, such as the game start timing, a specific timing in the game progression including a timing when the game level, the character level of the player character, or the stage in the game changes, or a timing indicated by the player.

[3.4] Task Setting Process

[3.4.1] Basic Principle of Task Setting Process

Figure 7:
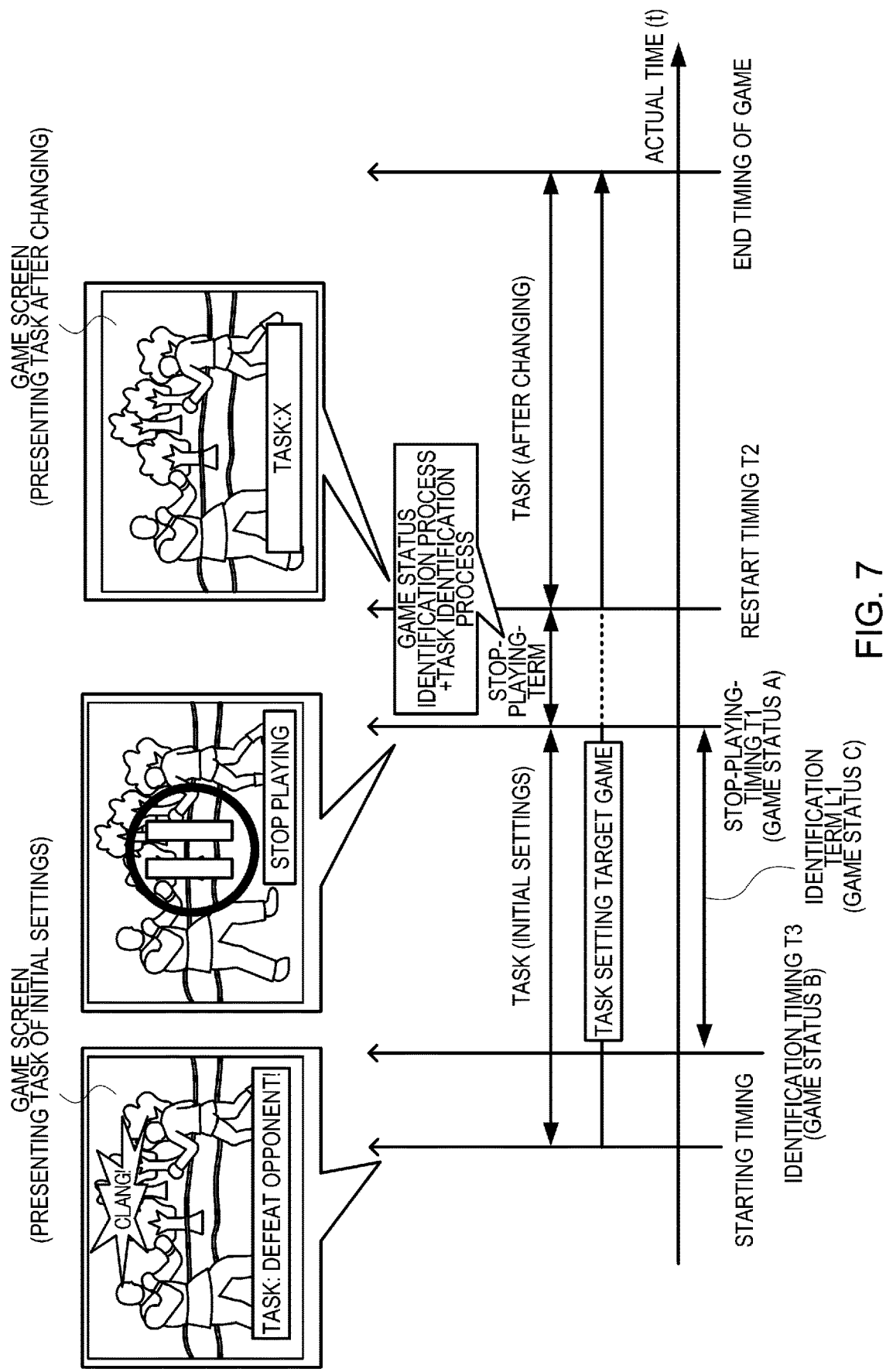
FIG. 7 is a diagram for explaining a basic principle of the task setting process in one embodiment of the present invention.

Next, the basic principle of the task setting process of the present embodiment will be described with reference to FIG. 7. FIG. 7 is a diagram for explaining a basic principle of the task setting process of the present invention.

As illustrated in FIGS. 3 and 7, during the progress of the task setting target game (that is, during performing the game control process), the game management unit 117 performs, as the task setting process of the task setting target game:

(A1) the stop-playing process to stop-playing the game when a given input operation is received from the player during the progress of the game;

(A2) the game status identification process to identify the game status at the stop timing indicating the timing at which the game is stopped-playing by the stop-playing process, or the game status up to the stop timing; and (A3) the task identification process to identify the task information corresponding to the identified game status from among the stored task information. In other words, the game management unit 117 performs the task setting process to set the task in the identified task information as the task of the task setting target game.

The game management unit 117 performs, as the stop-playing process, a process to stop-playing the game the progress of the game during performing the game control process including the operation control of the player character based on the player's input operation, when the instruction reception operation input reception process unit 113 recognizes that the player's input operation is a task setting instruction.

The game management unit 117 may stop the progress of the game at a timing (hereinafter referred to as "operation timing", including a time lag in game process until the operation input reception process unit 113 recognizes the input after the operation timing) in which the controller 30 accepts a give input operation of the player. Further, the game management unit 117 may stop the progress of the game at a suitable timing for restarting the game after the operation timing when the progress of the game is stopped at a timing at which it becomes difficult to restart the game after the stop, such as a timing during the attacking (including the attacking to or from the enemy character).

As illustrated in FIG. 7, as the game status identification process, the game management unit 117 identifies:
(B1) a game status of the stop-playing timing;
(B2) a game status of the specified timing (identification timing) that comes before the stop-playing timing including the game start timing, and that is a predetermined timing based on the stop-playing timing; or
(B3) a game status during the predetermined term (hereinafter referred to as "identification term") from the identification timing to before the stop play timing.

For example, as described above, the game management unit 117 identifies, as the game status:
(C1) the status of the game element to the game result and the temporal game element, such as a status of a game result of the player or player character, and the status of temporal elements of the stop-playing timing;
(C2) a game element for construction the game space or for arranging a character in game space, such a position and parameter of each character including a player character and position, characteristic, and parameters of each object in the game space; or
(C3) a combination of (C1) and (C2).

As illustrated in FIG. 7, the game management unit 117 identifies, from the task information stored in the memory unit 170, the task information having a game identification status that matches the identified game status, and sets the task included in the identified task information as a task for the task setting target game.

In other words, the game management unit 117 searches the task information stored in the memory unit 170 using the identified game status as a search key, and detects the task information that matches the search key.

Further, the game management unit 117 sets the task stored in association with the detected task information as the task of the task setting target game.

FIG. 7 is a diagram illustrating the respective timing or the identification term of the game statuses identified by the game status identification process. Further, FIG. 7 shows the game status A that is a status at stop-playing timing T1, the game status B that is a status at the identification timing T3 and the game status C that is a status in the identification term Li.

Specifically, FIG. 7 is a diagram indicating that the task X of the task setting target game restarted from the restart timing T2 based on the contents of the game status B and the game status C.

In FIG. 7, the restart timing T2 indicates in the figure indicates the timing for restarting the task setting target game after the stop-playing timing, the details are explained in the section on the task setting target game instruction control process.

The game management unit 117 may set a plurality of tasks as the task for the task setting target game when the game status matches a plurality of game identification statuses stored in the memory unit 170. Further, the game management unit 117 may set one or more tasks as the task for the task setting target game based on a predetermined degree of priority for the plurality of game identification statuses that are matched.

The game management unit 117 may set the tasks for the task setting target game according to a predetermined degree of priority, such as a predetermined degree of priority for each game identification status, a degree of priority set based on the player's attribute (for example, a game level, the total time of the game play, or a login status when logged in to the game).

For example, the predetermined degree of priority for each game identification status is an indicator to set a defensive task (for example, protecting the attack of throw) when received from an enemy character rather than an offensive task (for example, using a lot of kicking) by the player character to the enemy character, or to set a task (for example, defeat the enemy character within 10 terns) to clear the stage rather than an offensive task (for example, attacking with the special move) against enemy characters by the player character.

[3.4.2] Task Setting Process of Identification Term

Figure 8:
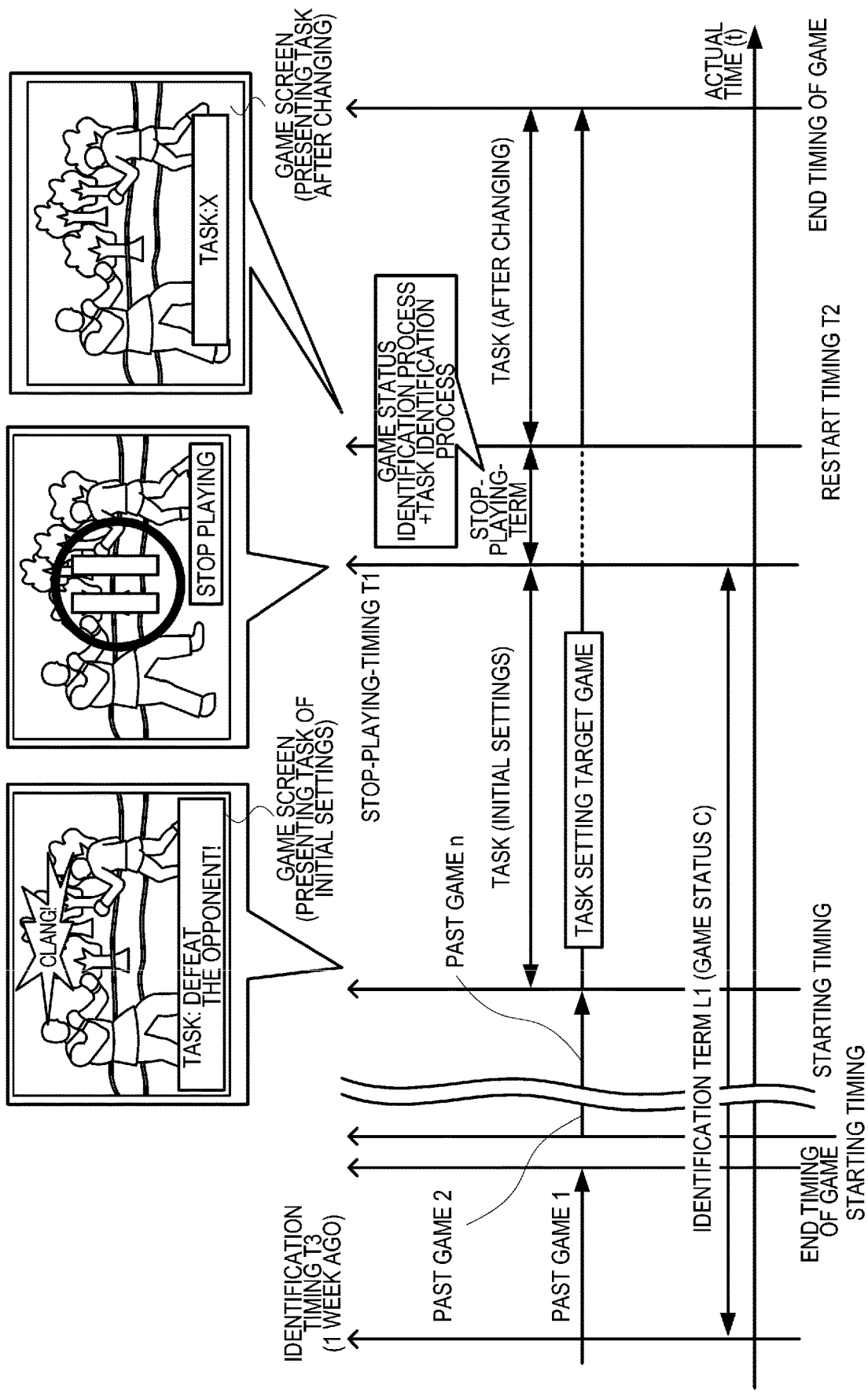
FIG. 8 is a diagram for explaining the task setting process of an identification term in one embodiment of the present invention.

Next, the task setting process of the identification term of the present embodiment will be described with reference to FIG. 8. FIG. 8 is a diagram for explaining the task setting process of the identification term of the present invention.

When using the identification term in the game status identification process described above, the game management unit 117 performs the task setting process on the premise that, in the memory unit 170, the task information which the task is associated with each game identification status in the identification term, is stored. Further, the game management unit 117 performs the task setting process to set the task of the identified task information, as the task of game stopped by the stop-playing timing. Specifically, the game management unit 117 performs the task setting process including:
(A1) the game status identification process to identify the game status, which includes the game status at the stop play timing, in the identification term from a give timing (hereinafter referred to as the "identification timing") to the stop play timing; and
(A2) the task identification process to identify the task information corresponding to the game status in the identification term from among the task information stored in the memory unit 170.

In other words, in order to set the task more suitable for each player, the game management unit 117 sets the task by referring not only to the game status at the stop-playing timing but also to the player's operations during a certain term from the identification timing to the stop-playing timing, the identification timing being a timing of game start or a timing when the operation of the current player character starts.

Specifically, when performing the stop-playing process by accepting a given player's input operation during the task setting target game, as illustrated in FIG. 7, the game management unit 117 performs the game status identification process to identify the game status (ranking changes and battle record changes), such as a status of the results in the identification term Li from a predetermined timing to the stop-playing timing, and a temporal status (elapsed time from the start of the new stage and remaining time until the time limit).

When performing the stop-playing process, instead of these game statuses, the game management unit 117 may perform the game status identification process to identify the game elements constituting the game space and the characters in the game space, as the game status, such as: the position of each character including the player character (whether the player character has reached the destination or not, or the progress to the destination); each parameter (change of life energy, hit points or experience points), the position, characteristics and parameters of each object constituting the game space (destruction status of a specific object).

When identifying the game status, as described the above, the game management unit 117 performs the task setting process to set the task in the identified task information, as the task of the task setting target game, by identifying the task information that matches the search key of the identified game status from among the task information stored in the memory unit 170.

When performed the task setting target game in past, the game management unit 117 may perform the game status identification process not only to identify the game status of the task setting target game in progress, but also to identify the game status of the task setting target game in past (hereinafter, referred to as a "past game").

Specifically, the game management unit 117 performs the game status identification process of not only the task setting target game played a week ago, but also the task setting target game played in past. For example, as illustrated in FIG. 8, the game management unit 117 sets, to the identification timing T3 in advance, the same timing as the timing of the task setting target game that is a game played by the player in past, and identifies the game status of a plurally of games that is the same game in the identification term Li from the identification timing to the stop play timing.

In this case, the task information, which a task is associated with each game identification status in such an identification term, is stored in the memory unit 170. The game management unit 117 performs the task setting process in the same manner as described above, based on the identified game status as a search key, from among the task information stored in the memory unit 170. The game management section 117 executes the task setting process using the identified game status as a search key from the task information stored in the memory 170.

FIG. 8 shows an example: when a predetermined time a week ago (for example, 0:00 a.m.) is set as the identification timing T3; when identifying the game status based on a plurality of the games that is from the past games 1 to the past game n (the plurality of the games that is the same game as the task setting target game (including the same settings of player characters)); and when setting the task X based on these game status, and presenting the set task X.

In FIG. 8, similar to FIG. 7, the restart timing T2 indicates in the figure indicates the timing for restarting the task setting target game after the stop-playing timing, and the details are explained in the section on the task setting target game instruction control process.

[3.4.3] Task Setting Process Based on Character

Next, the task setting process based on the characters of the present embodiment will be described with reference to FIG. 9. FIG. 9 is a diagram illustrating an example of task information stored in the memory unit 170 when performing the task setting process based on the character in the present embodiment.

When using the game element of the character in the game status identification process described above, as illustrated in FIG. 9, the game management unit 117 performs the task setting process on the premise that, in the storage unit 170, the task information in which the task is associated with each game identification status in the identification term, is stored. Further, the game management unit 117 performs the task setting process to set the task of the identified task information, as the task of game stopped by the stop-playing timing.

Specifically, the game management unit 117 performs the task setting process including:

(A1) the game status identification process to identify the game status at the stop-playing timing, the identification timing, or during the identification term; and (A2) the task setting process to set the task of the task information, as the task of game that is stopping at the stop-playing timing.

In other words, in order to set the task that take into consideration the characteristics of the player character, such as tasks that the player character can achieve with the specialty attacks and special moves of the player character, the game management unit 117 sets the task reference to the stop play timing of the character and the player's operation of the character (specifically, the player character) during the identification term.

Specifically, when performing stop-playing process by accepting a given operation input from the player during the task setting target game, the game management unit 117 performs, as the game status, the game status identification process to the status of the character, such as the player character and the enemy character.

For example, as illustrated in FIG. 9, the game management unit 117 is configured to enable to set the task based on the type of the attacks that the player has used a lot, attributes of the player character, abilities or characteristics (special moves) that the player character has, or attacks from the enemies that the player is not good at (such as damaged techniques).

FIG. 9 is a diagram illustrating the example when paling the game to defeat a plurality of enemy characters with the game level of the stop-playing of the player as the game identification status. Further, FIG. 9 is a diagram illustrating the example of the task information having the task that is the number of enemy characters to be defeated (including boss characters) and special task (to be defeated only by consecutive attacks (combo)) for each game level range and each character type (attribute) of the player character.

For example, the character status includes the various statuses of the character's attributes, such as types, abilities, levels, and characteristics, and items owned (types, numbers, abilities and characteristics of the item).

[3.4.4] Task Setting Process During Replay

Figure 10:
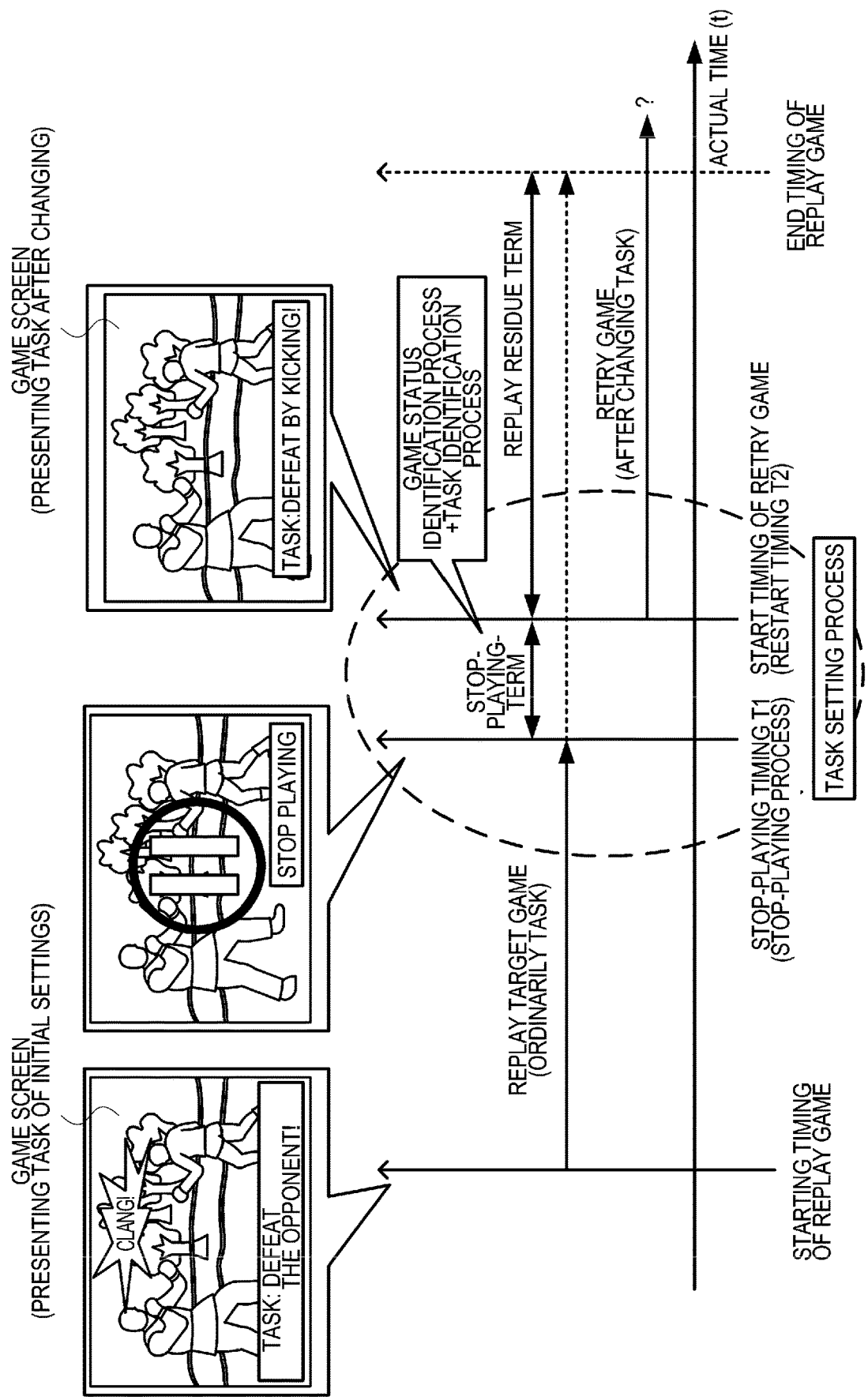
FIG. 10 is a diagram for explaining the task setting process during the replay in one embodiment of the present invention.

Next, the task setting process during the replay in the present embodiment will be described with reference to FIG. 10. FIG. 10 is a diagram for explaining the task setting process during the replay in the present embodiment.

When performing the replay process according to the game data read from the memory unit 170 by the replay process unit 116, the game management unit 117 performs the task setting process to set, as the task of game that is stopping at the stop-playing timing, the identified task: to perform the process (stop-playing process) to stop-playing the game during the replay; and to perform the game status identification process and the task information identification process as described the above.

In this case, the game management unit 117 is configured to enable to set the task of the game according to the operational ability of each player and to present the set task when the player is reviewing the game played by the player in the past by replay process, or when the player is referring to the game played by others.

The data management unit 115 stores, as the game data for the replay, game data used when performing the game control process to memory unit 170.

In order to perform the game, the replay process unit 116 reads the game data stored in the memory unit 170, and performs the replay process to replay the play contents of the game from a given timing, such as the game start timing, based on the read game data.

As illustrated in FIG. 10, the game management unit 117 performs the task setting process to the identified task, as the task of the game that is stopping at the stop-playing timing. Specifically, the game management unit 117 performs:

(A1) the stop-playing process to stop-playing the game when a given input operation is received from the player during the replay of the replay target game;

(A2) the game status identification process to identify the game status at the stop timing indicating the timing at which the game is stopped-playing by the stop-playing process, or the game status up to the stop-playing timing; and (A3) the task identification process to identify the task information corresponding to the identified game status from among the stored task information.

The game management unit 117 performs the task presentation process to present, to the player, the task which is set by the above task setting process, as the task of the replay target game that is stopping at the stop-playing the timing.

When setting a new task (in FIG. 10, when changing from the task "defeat opponent" to the task "defeat by kicking"), as illustrated in FIG. 10, the game control unit 114 starts the game control process using the game that is the same as the replay target game having the task, as a retry game based on the game status that is basically the same as the game status at the stop-playing timing.

FIG. 10 is a timing chart showing an example when starting the replay target game from the middle of the replay target game after playing the replay task setting game of the replay process.

Specifically, FIG. 10 is the timing chart indicates, in actual time axis, the timings such as the timing when starting the replay target game, the stop-play timing T1 indicated by the player; the timing T2 when restarting the retry game (the restart timing when being set by the restart timing set process) and the end timing of replay game.

In FIG. 10, similar to FIGS. 7 and 8, the restart timing T2 indicates in the figure indicates the timing for restarting the task setting target game after the stop-playing timing, and the details are explained in the section on the task setting target game instruction control process.

In the task setting process during the replay processing, it is assumed that the task information stored in the memory 170 in association with the length (length of time) of the term (hereinafter, referred to as the "replay residue term") from the stop-playing timing to the end timing of the replay process. As illustrated in FIG. 10, the game management unit 117 may perform the task setting process using the task information including the length of term of the replay residue term stored in this manner as the game status.

In this case, when the replay residue term from the stop-playing timing to the end timing of the replay process is a long term, the game management unit 117 can set the task with a low degree of difficulty for the player to operate or the task that can be steadily completed when time is taken, although the rewards for the players is low. Further, when the replay residue term is a short term, the game management unit 117 can set the task with a high degree of difficulty or high risk for the player to operate, although the rewards for the players is high.

Therefore, in this case, the present embodiment can present a task to player from various degrees of certainty even when referring to the same replay process, because the task can be varied when the stop-playing timing of the replay process in progress of the game is different.

The game management unit 117 performs the task setting process to identify the length of the replay residue term, to identify the task information from among the task information stored in the memory unit 170, and to set the task of the game that is stopping at the stop-playing timing.

The game management unit 117 identifies the task information from among the task information stored in the memory unit 170 according to the game process other than the above length of term, and change the task information according to the length of term.

For example, the game management unit 117 may identify the task, "get a specific item" from among the task information stored in the memory unit 170 according to the game process other than the above length of term. The game management unit 117 may identify the task, "get one of the specific item" when the length of the term (the replay residue term) is ⅓ or less of the whole (that is, the total term of the replay). Also, The game management unit 117 may identify the task, "get three of the specific item" when the length of the term (the replay residue term) is ⅓ or more of the whole and ⅔ or less of the whole. Further, The game management unit 117 may identify the task, "get five of the specific item" when the length of the term (the replay residue term) is ⅔ or more of the whole.

[3.4.5] Task Setting Process of Multiple Players

Next, the task setting process of the multiple players of the present embodiment will be described.

When playing the task setting target game by the plurality of players, the game management unit 117 may identify the game status of the game played by the plurality of players as the game status identification process, and identify the task information corresponding to the game status of the game played by the identified plurality of players.

In other words, when playing a multiplayer game, such as a multiplayer battle game, and when playing a game that is joined by the plurality of players, the game management unit 117 may set the task for a specific one player, as described above, and the tasks for the plurality of players.

In this case, the game management unit 117 may set a common task for a plurality of players, or may set a task for each of the plurality of players.

When playing a knockout game such as a battle royale, by a plurality of players or player characters operated and controlled by each player (hereinafter referred to as the "operation target player characters"), or a game by a team belonging a plurality of players or a plurality of player characters to be operated (including a game played by other players or the operation target player characters operated and controlled by each player, with cooperative play), the game management unit 117 may set the task for the plurality of players.

In other words, the game management unit 117 set the task of the plurality of the players regarding the game such as a multiplayer game, a battle game, RPG (for the participation of the plurality of players), a race game and a shooting game, except for a single play.

When setting the tasks of the plurality of players or the task of the team having the plurality of operation target players, the game management unit 117 performs the task setting process on the premise that, in the storage unit 170, the task information which the tasks of the plurality of players or the plurality of operation target players are associated with each game identification status, is stored. Further, the game management unit 117 performs the task setting process to set the tasks of the identified task information, as the tasks of game stopped-playing by the stop-playing timing. Specifically, the game management unit 117 performs the task setting process including:

(A1) the game status identification process to identify the game status, which includes the game status of the plurality of players or the team at the stop play timing, in during identification term from a give timing (hereinafter referred to as the "identification timing") to the stop play timing; and (A2) the task identification process to identify the task information corresponding to the game status at the stop-playing timing, at the identification timing or during the identification term from among the task information stored in the storage unit 170.

For example, in addition to or instead of the above game status, the game management unit 117 performs the game status identification process to identify, as the game status:

(B1) a status determined based on the attributes, characteristics, and abilities of the player characters to be operated by each of players, such as the percentage of or the total number of player characters having specific attributes, characteristics, and abilities;

(B2) a status determined based on various parameters such as the level, experience point, and hit point of each of player characters, such as the percentage of or the total number of player characters having specific attributes, characteristics, and abilities; and (B3) a status determined based on the type, number, characteristics, and abilities of items possessed by each of player character, such as the percentage of or the total number of player characters with specific items (attributes, characteristics, abilities, and number of specific items).

In addition to the above task, the game management unit 117 performs the task identification process to identify the task information corresponding to the game status at the stop-playing timing, at the identification timing or during the identification term from among the task information having:

(C1) a task to be accomplished by a group having a plurality of players or player characters;

(C2) a task to be accomplished by an individual player character through cooperative play of the plurality of players or player characters; and (C3) a task for each of players who operates a player character in a game played between the plurality of player characters.

In the case where setting tasks for each of a plurality of players, the game management unit 117 may perform the above task setting process for each of the players.

When the game is played by a plurality of players (including CPU players), such as in the multiplayer game including the multiplayer battle game, and determines victory and defeat of the plurality of players, the game management unit 117 may perform the task setting process to set the task for players who meet a given condition, such as defeated players or players with poor performance.

In other words, the game management unit 117 is configured to enable to set the task for defeated players and players with poor performance in order to facilitate practicing to improve each player's operation skill for players with a low operation skill, such as beginners, who have difficulty finding tasks on their own.

Specifically, the game management unit 117 performs the task identification process to identify the task as the task of the game that is stopping at the stop-playing timing by performing:

(D1) a process to select a player who has a given condition from among a plurality of players (hereinafter also referred to as the "player selection process") when stopping the task setting target game by the sop-playing process during the game progress;

(D2) a game status identification process to identify the game status at the stop-playing timing, at the identification timing or during the identification term for the selected player; and (D3) a task information identification process including process to identify task information corresponding to the identified game status from among the stored task information, and to set the task in the task information, as a task of the task setting target game, for a player who have a given condition.

In the player selection process, the game management unit 117 selects the player based on the given condition, such as:

(E1) a condition whether or not the player is the player who controls the defeated player character in the multiplayer game; or (E2) a condition whether or not the player operating the player character has a predetermined condition for the amount of damage received from the enemy character.

[3.5] Task Presentation Process

Figure 11:
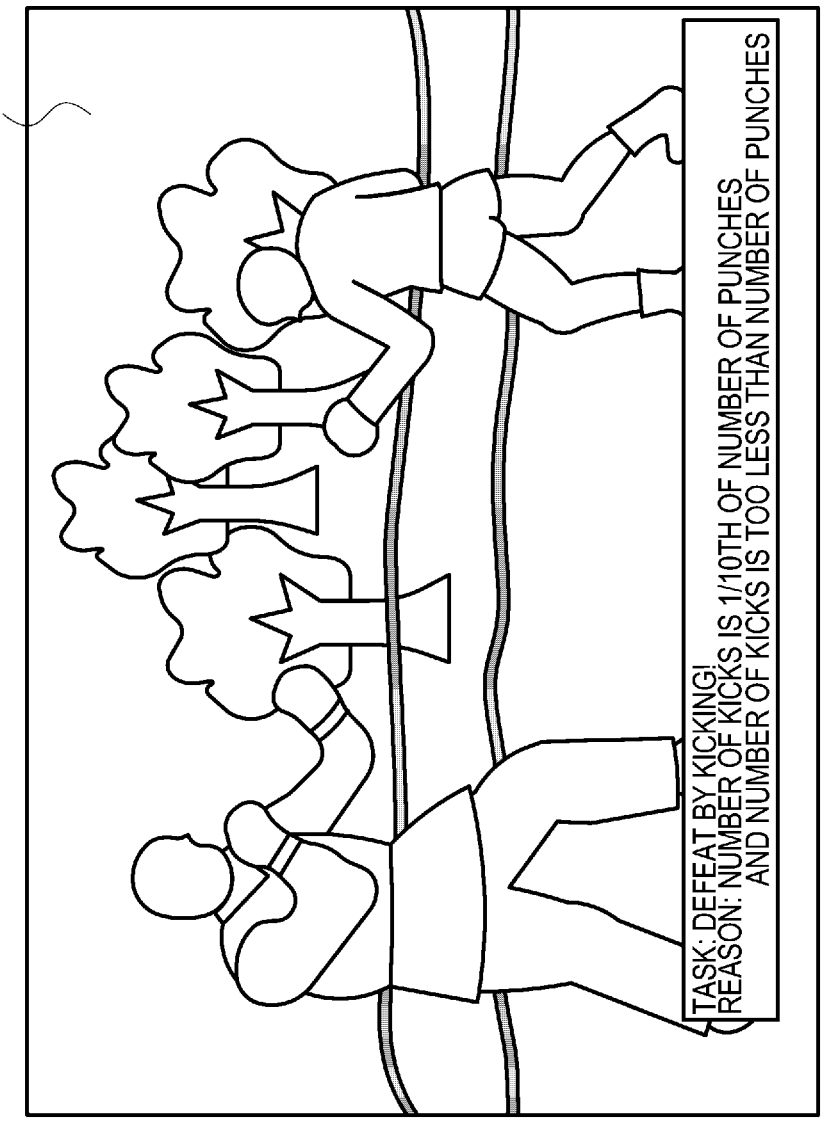
FIG. 11 is a diagram illustrating an example of a task that is displayed in a game screen by the task presentation process in the embodiment of the present invention.

Next, the task presentation process of the present embodiment will be described with reference to FIG. 11 in addition to FIGS. 3, 7, 8 and 10 above. FIG. 11 is a diagram illustrating an example of a task that is displayed in a game screen by the task presentation process in the present embodiment.

The display control unit 118 performs the task presentation process to present, to the player, the task set by the task setting process, as a task of the game (that is, the task setting target game) that was playing until the stop-playing timing.

The display control unit 118 may not only present a single task indicated by the identified task information to the player, as the task of the game, but also present a plurality of tasks when the game status at or until the stop-playing timing matches the stored game identification status.

When a plurality of tasks is presented, the display control unit 118 may uniformly present a plurality of tasks, or present tasks in order according to predetermined priority.

For example, when presenting a task, the display control unit 118 displays the set tasks in a part of the game screen area, as shown in FIGS. 3, 7, 8 and 10 (game screen).

As illustrated in FIG. 11, the display control unit 118 may display the information regarding the task on the display 40 as a task display process to present to the player, along with the identified task.

Because it can be recognized more clearly, the display control unit 118 can allow each of players to interest the game by providing the game that has the task, and can allow each of players to practice seriously for improving the operation ability of each of players.

For example, "information regarding the tasks" includes information such as:

(A1) information of the identified game status including a status at the stop-playing timing; and (A2) information of the reason why the presented task was identified.

The reason why the presented task was identified is stored in memory unit 170 in association with the corresponding task information, and is read out and presented when the task is identified.

FIG. 11 is a diagram illustrating an example when displaying, on the game screen, the new identification task "defeat by kicking" and the reason for clearing the task of the previous game "too small when the number of attacks for kicking is 1/10 of punching".

[3.6] Game Instruction Control Process

[3.6.1] Basic Principle of Game Instruction Control Process

Next, the basic principle of the game instruction control process of the present embodiment will be described with reference to FIGS. 3, 7, 8 and 10.

As described above, when setting the task of the task setting target game, the game control unit 114 restarts the game control process, as the game instruction control process of the task setting target game, based on the set task, in order to improve the operation skill with challenges of the player.

For example, as illustrated in FIGS. 3, 7, 8 and 10, when setting the task by the task setting process after the stop-playing timing, the game control unit 114 performs the game control process based on the player's input operation, by restarting the task setting target game from the restart timing (T2 in figures) while the game status at the point for finding the challenge is maintained.

In other words, when setting the task by the task setting process during a predetermined term after the stop-playing timing (that is, the stop-playing term in actual time), the game control unit 114 restarts the task setting target game based on a predetermined trigger such as a predetermined operation of the player and detection that the task is set, while the game status at the stop-playing timing is maintained.

Therefore, in the present embodiment can be provided the game suitable for improving challenging operation skills without reducing the player's interest in the game.

[3.6.2] Preprocess Part 1 of Game Instruction Control Process

Figure 12:
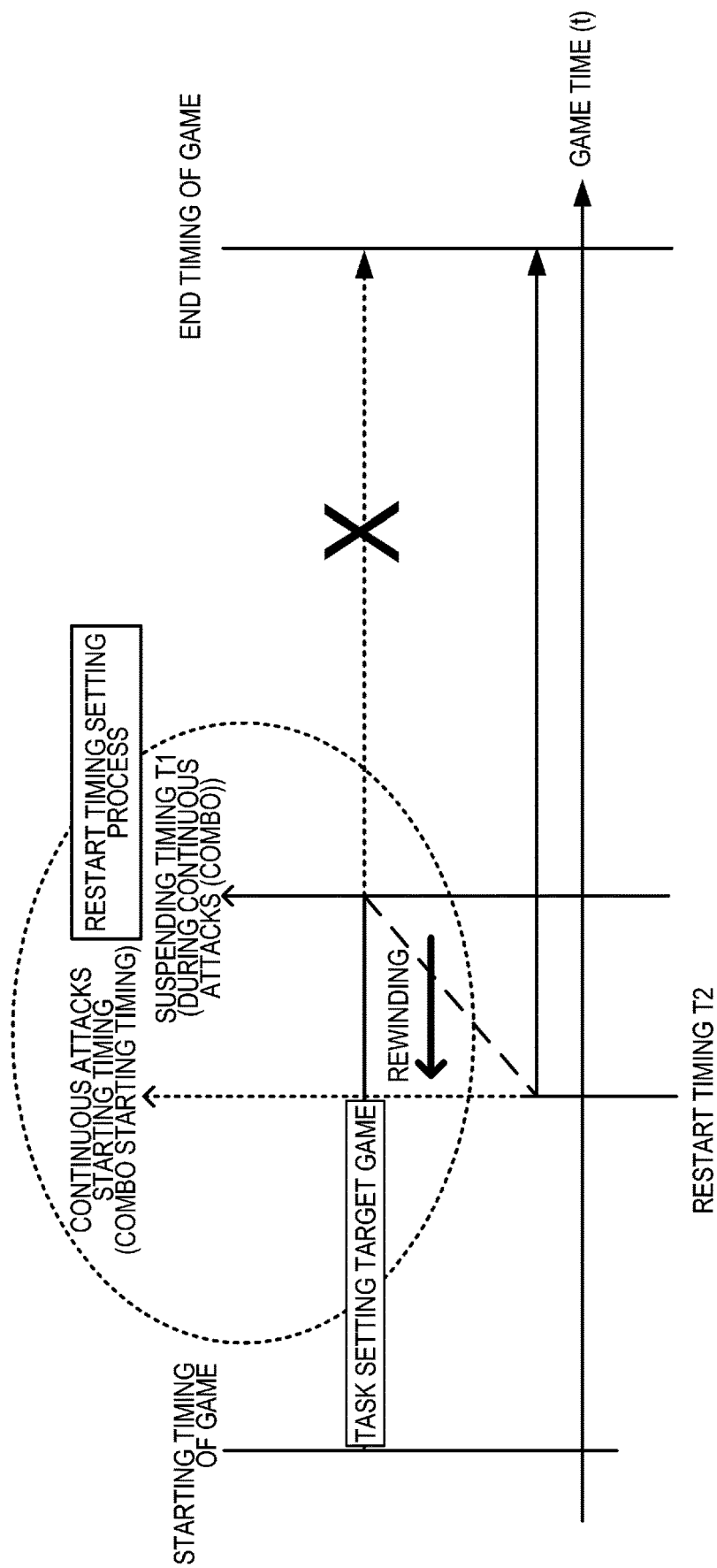
FIG. 12 is a diagram for explaining a preprocess of a game instruction control process in one embodiment of the present invention.

Next, the preprocess (part 1) of the game instruction control process of the present embodiment will be described. FIG. 12 is a diagram for explaining a preprocess of the game instruction control process of the present embodiment.

(Outline of Preprocess of Game Control Process)

First, in order to set the restart timing, the game management unit 117 perform the restart timing process to set the restart timing to restart the game control process for the task setting target game corresponding to the player input operation based on the stop-playing timing identified by the stop-playing process.

Next, the game management unit 117 performs s process (hereinafter referred to as the "setting determination process"): to identify the game status at the stop-playing timing or the game status until the stop-playing timing, as the game status at the restart timing; and to determine a given setting of the game when starting the game control process corresponding to the player input operation in the task setting target game based on the identified the game status.

As a result, the game control unit 114 performs the game control process of the task setting target process, as the game instruction control process, from the restart timing, based on the setting determined by the setting determination process as described above and the accepted player's input operation.

The restart timing is a timing rewound from the stop-playing timing in the game time (on the game time axis), and a timing after the stop-playing timing in the actual time (on the actual time axis).

(Basic Principle of Restart Timing Setting Process)

Basically, when setting the stop-playing timing and a task by the task setting process as described above, the game control unit 114 restarts the game instruction control process using the stop-playing timing (in the game time) as the restart timing while the game status at the stop-playing timing is maintained.

When the restart timing is a timing when the task does not change after stop-playing timing, a timing at which another event has already occurred, or a timing at which an event caused by the motion of the player character at the stop-playing timing occurs, the game control unit 114 rewinds the game time up to the timing before the stop-playing timing.

In other words, as described above, when it is necessary to set the restart timing before the stop-playing timing in the task setting target game, the game management unit 117 performs the restart timing setting process to set, as the restart timing, the timing identified in advance by the player, the timing uniformly before the stop-playing timing, or the timing predetermined in the game.

For example, as illustrated in FIG. 12, when the stop-playing timing during the continuous attack (that is, comb) is inappropriate as restart timing, the game management unit 117 sets the timing before starting the continuous attack as the restart timing.

FIG. 12 is a diagram illustrating a timing chart based in the game time, and an example when restarting the task setting target game from the restart timing by rewinding the game from the stop-playing timing in order to compare to when restarting the task setting target game from the stop-playing timing.

When setting, as the restart timing, the timing identified in advance by the player, the timing uniformly before the stop-playing timing, or the timing predetermined in the game, and when these timing is a timing at which task cannot be changed after the stop-playing timing, a timing at which other events have already occurred, or a timing at which events resulting from the player character's actions at the stop-playing timing have already occurred, the game management unit 117 set, as the restart timing, a timing farther prior to these timings (for example, a timing before the event occurred).

The game management unit 117 may set, as the restart timings, a plurality of timings, and set, as the restart timing, the timing that is selected by the player from among a plurality of timings.

When the stop-playing timing is during an event occurred by the special command, based on the player's input operations, the game management unit 117 may present a plurality of timings detected in the task setting target game, and set, as the restart timing, the timing selected by the player, wherein the plurality of timings are a first timing before the instruction of the specific command, a second timing before the start of performing of the specific command, and a third timing that is the identified timing during the event caused by the specific command.

In this case, for example, the game management unit 117, in conjunction with the display control unit 118 and the drawing unit 120, may present the plurality of timings to the player by displaying a plurality of the detected options on the display unit 40, or by displaying each of the plurality of the detected options on the display unit 40 as an image (for example, thumbnail, and chronologically frame-by-frame display).

[3.6.3] Preprocess Part 2 of Game Instruction Control Process (Setting Determination Process)

Next, the preprocess (part 2) of the setting determination process of the present embodiment will be described.

When the stop-playing is different from the restart timing in the game time, the game management unit 117 performs the setting determination process to identify the game space of the task setting target game at the restart timing, and to determine given settings of the game when starting the game instruction control process from the restart timing.

In other words, the game management unit 117 determines, as the setting determination process, the various settings for starting (restarting) the task setting target game while maintaining: the game status at a predetermined timing; and the game status at the restart timing when the stop-playing timing is different from the restart timing.

When the stop-playing is the same as the restart timing (in the game time), because the game status maintains the same, the game management unit 117 starts the game instruction control process of the task setting target game while the game space at the stop-playing timing is maintained. Incidentally, in this case, the game management unit 117 may perform the setting determination process, like when the stop-playing timing is different from the restart timing.

The game management unit 117 performs the setting determination process to determine, as the given settings in the game when starting the game instruction control process from the restart timing, the first settings to faithfully reproduce the identified game status, or the second settings with some settings changed that do not faithfully reproduce the some game status of the first settings.

Specifically, the retry game setting unit 117 determines, as the settings, the parameters that indicate the identified game status when faithfully reproducing the identified game status.

For example, as described above, the game management unit 117 identifies, as the game status:
(A1) the status of the game element to the game result and the temporal game element, such as a status of a game result of the player or player character, and the status of temporal elements of the stop-playing timing;
(A2) a game element for construction the game space or for arranging a character in game space, such a position and parameter of each character including a player character and position, characteristic, and parameters of each object in the game space; or
(A3) a combination of (A1) and (A2).

When faithfully reproducing the identified game status, the game management unit 117 determines each of the game elements of these as the settings of the restarted task setting target game, and updates the settings of the task setting target game.

the game management unit 117, in conjunction with the display control unit 118 and the drawing unit 120, may provide, to player, the identified game status and the settings by displaying on the display unit 40.

Because the game that focuses on overcoming challenge can be realized by playing the game in which has setting different from the task setting target game played from the restart timing and before the stop-playing timing, the game management unit 117 may restart the task setting target game that do not faithfully reproduce the identified game status.

In other words, when the game status is not faithfully reproduced by changing a part of the identified game status, based on the identified game status, the game management unit 117 determines the settings except for given settings such as the hit point and the time limit, or the settings adding to given settings such as the level of the player and the number of the items.

In this case, the game management unit 117 performs the setting change process to determine the settings of at least some of the above game elements based on the player's input operations, before restarting the task setting target game.

For example, the settings changed by the setting change process, includes:
(B1) the position in the game space of each character including the player character and the enemy characters;
(B2) a type of each of the characters;
(B3) a type of and a number of the items in the player character;
(B4) a change to the game stage and quest; and
(B5) occurrence or cancellation of the event in the game space, such as the presence or absence of explosion and change in the game stage (for example, the floor breaks during battle).

The game management unit 117 may perform, as the setting change process, a process to change the settings that have been set already after playing the task setting target game.

[3.6.4] Game Instruction Control Process

Next, the task setting target game instruction control process of the present embodiment will be described with reference to FIGS. 3, 7, 8, 10 and 11.

(Principle of Game Instruction Control Process)

As illustrated in FIGS. 3, 7, 8, 10 and 11, the game control unit 114 performs the game instruction control process of the task setting target game, based on the settings determined by the setting determination process and the accepted player's input operation, from the stop-playing timing or from the restart timing when the stop-playing timing is different from the restart timing.

In other words, the game control unit 114 starts the task setting target game based on the same game status as the task setting target game at the stop-playing timing or the game status of the restart timing of the task setting target game. After starting the task setting target game, the game control unit 114 performs the game instruction control process of the task setting target game.

For example, the game control unit 114 controls the general control of the game as the game instruction control process not only the player character to be operated by the player, but also control of the motion of another character and control of each of the object in the game space.

The game management unit 117 further presents the tasks according to the achievement status of the determined task so as to set a new task (for example, Combo A+B, which is a more powerful attack than Combo A) when the set the task (for example, performing of Combo A) is completed.

(Reward Based on Accomplished Task)

When the task is accomplished as described above in the task setting target game, the game control unit 114 may provide the reward corresponding to the task, or the reward corresponding to the difficulty corresponding to the task.

In particular, when determining the difficulty level associated with a task,
the game control unit 114 may determine the difficulty level according to the achievement status of the same task in other players, wherein the game control unit 114 may tabulate the achievement status of each player in the same task in advance, and hold the tabulated results in the game system, or may use the tabulated results on the network.

[3.7] Other Example

Next, the other example of the present embodiment will be described with reference to FIGS. 13 to 14.

Figure 13:
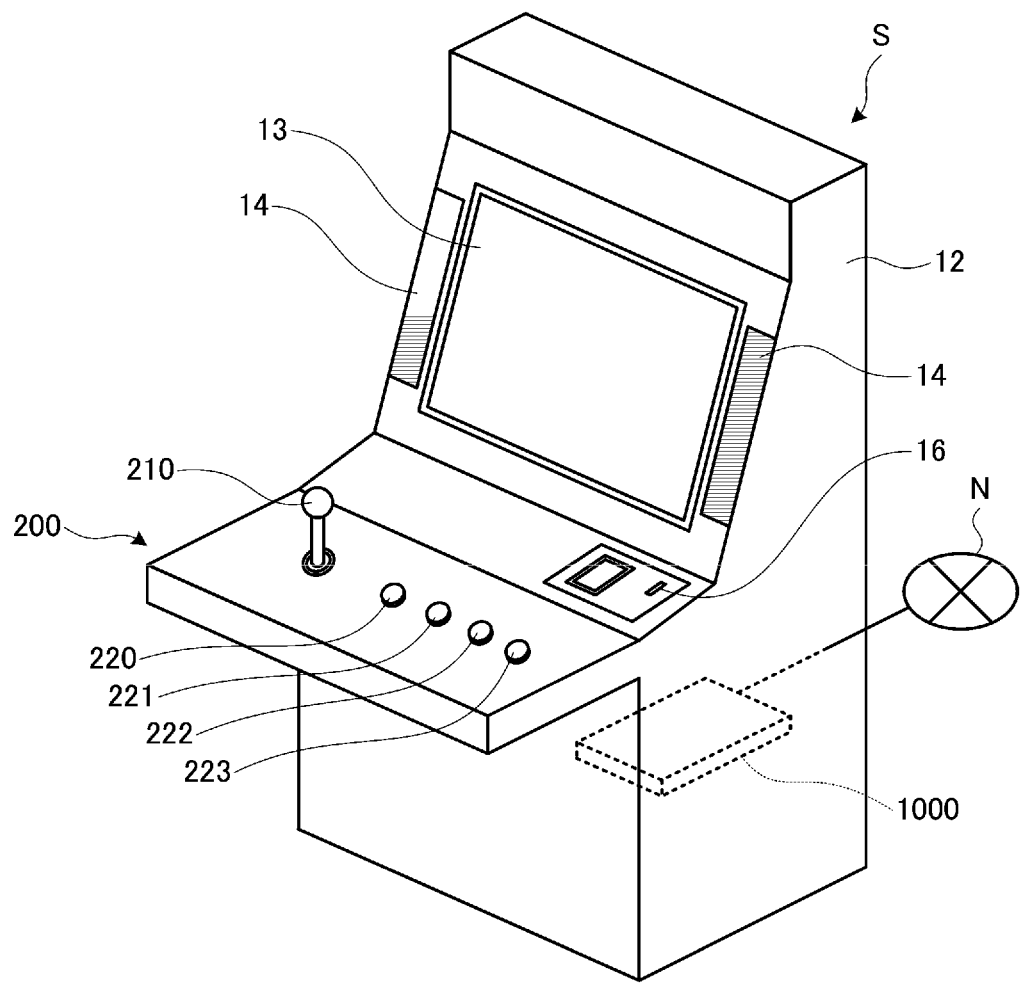
FIG. 13 is an outside drawing illustrating an example of an arcade game system based on the game system according to one embodiment of the present invention.

FIG. 13 is the outside drawing illustrating an example of an arcade game system based on the game system of the present embodiment. FIG. 14 is a system configuration diagram illustrating an example of the server system with a network based on the game system according to the present embodiment.

(Arcade Game System)

In addition to being applicable to a home-use game system, the game system S in the present embodiment can be implemented, for example, by an arcade game system set up in the store (amusement park), as shown in FIG. 13.

Figure 14:
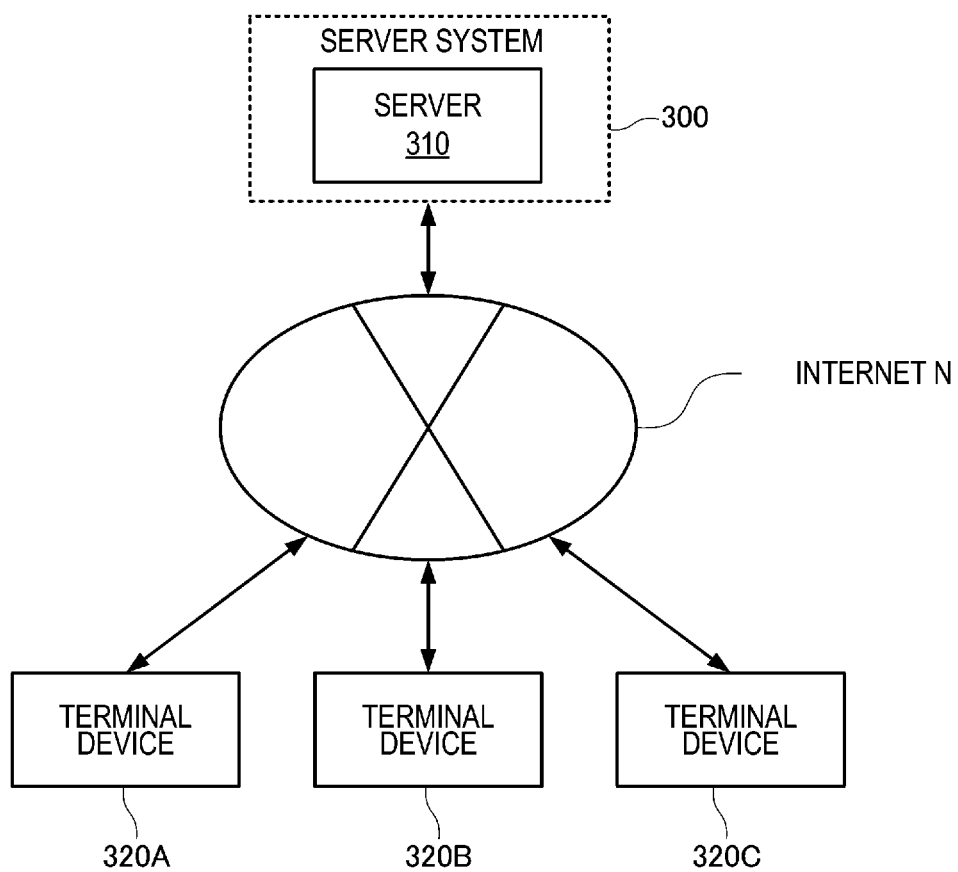
FIG. 14 is a system configuration diagram illustrating an example of a server system with a network based on the game system according to one embodiment of the present invention.

For example, as shown in FIG. 14, such a game system S has: a body 12 that has a processor (computer) that performs game process, etc.; a display 13 that shows a game screen; a speaker 14 that outputs sound effects and background music; a game operation unit 200; and a coin-insertion unit that is used for game play fees.

The game system S has the system board 1000 that has the CPU, image generation IC, sound generation IC and the like. The game system S is configured to perform the battle game based on the game program and game data read from a memory, which is an information storage medium, and an instruction signal input from the controller 32 and buttons.

The game operation unit 200 has the same function as the controller 30 described above, and thus has a lever 210 and buttons 220, 221, 222 and 223.

For example, the right hand button 220 is an input unit for "right punch," the left hand button 221 is an input unit for "left punch," the right foot button 222 is an input unit for "right kick," and the left foot button 223 is an input unit for "left kick".

(Network Play for Battle Game)

The game system S of the above embodiment has a plurality of controllers 30, and a battle game is played by having each controller 30 operated by each player. However, by connecting a plurality of the game systems S via a network, it is possible to control the player characters for each of the game system S, and to perform each of the above process of each of the game system S including the game control process by working together with each of the process, with each of the above configurations.

(Server System)

In the above embodiment, as shown in FIG. 14, a server system 300 may has one server 310 to provide the above game to one or more terminal devices 320 via a network N. Alternatively, the server system 300 may has a plurality of servers 310 may work together to provide the game to one or more terminal devices 320.

Specifically, the server system 300 works as the above game system while connecting the plurality of terminal devices 320 to the server system 300 via a network N by wired communication or wireless communication.

The server system 300 may serve as the game system by providing the game data of replay process (including only image data) and the game data of the control process (including only image data) to the relevant terminal device 320, while accepting the player's input operation.

In this case, the game system S is configured to:
(A1) manage, as the task information, the task imposed by the player during playing the game according to the game identification status of the predetermined game in the database (not shown);
(A2) accept the player's input operation input to the terminal device 320;
(A3) perform the game control process to control the progress of the game by controlling the player character according to the accepted player's input operation;
(A4) perform the stop-playing process to stop-playing the game when accepting a given player's input operation during playing the game;
(A5) identify the game status of the stop-playing timing that indicates a timing at which the game was stopped-playing by the stop-playing process or the game status up to the stop-playing timing;
(A6) identify the task information corresponding to the identified game status from among the task information stored in the database;
(A7) perform the task present process to present, to player, as the task of the game subject to the stop-playing timing, the task in the identified task information.

In this case, the server system 300 is configured to perform the game instruction control process from the restart timing, as the task setting target game, based on the setting determined by the determination process and the accepted player's input operation.

Although the game system of the present invention is applied to the server system 300 that runs in conjunction with the terminal device 320 through the network, the game system of the present invention may also be applied to the tablet-type information terminal device and the personal computers.

[4] Operation of Present Embodiment

Next, the operations of the game process when performing the task setting target game by the game system S of the present embodiment will be described with reference to FIG. 15.

Figure 15:
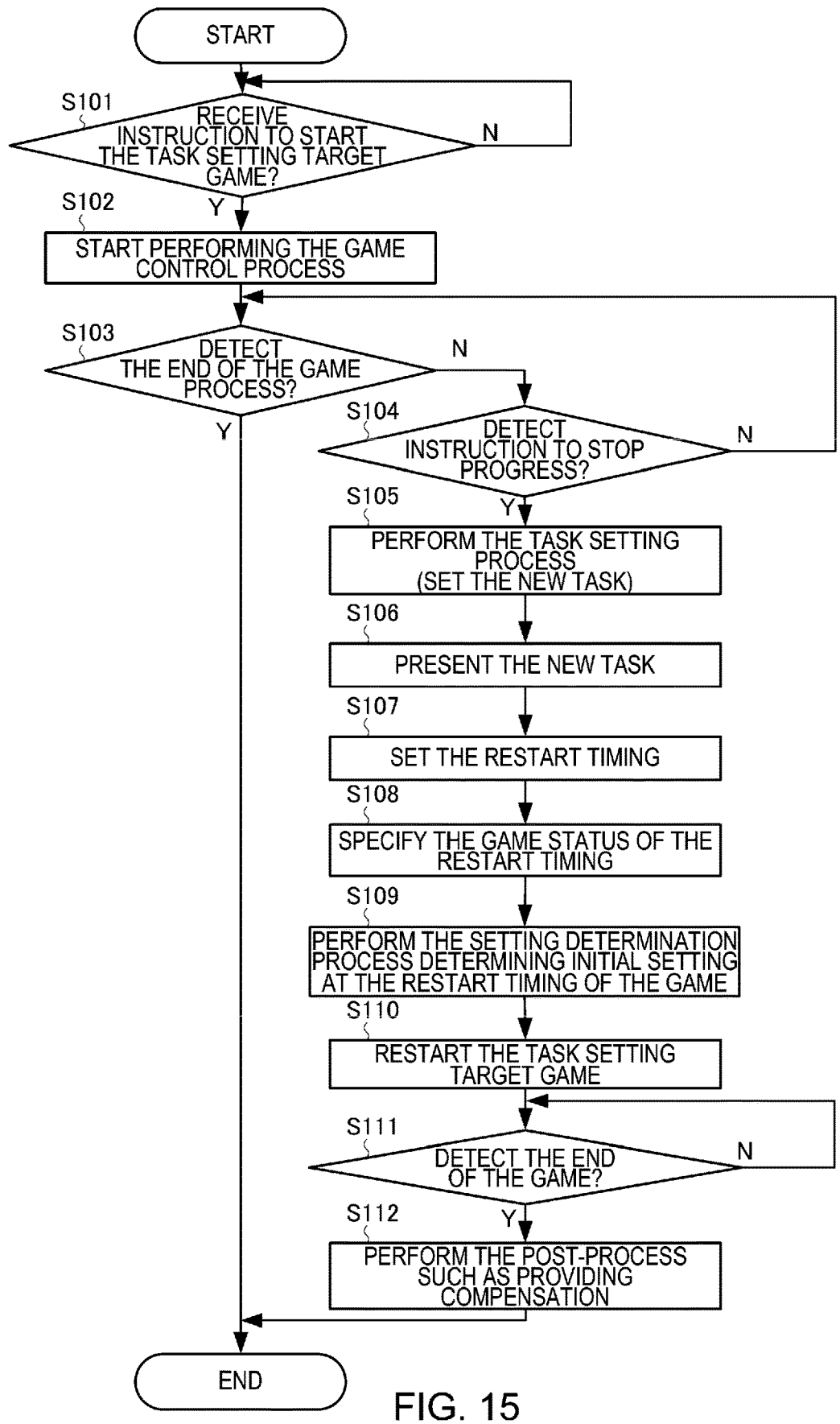
FIG. 15 is a flowchart illustrating the operation of the game process including the task setting process and the task presentation process by the game system when playing a given game in one embodiment of the present invention.

FIG. 15 is a flowchart illustrating the operation of the game process including the task setting process and the task presentation process by the game system when playing a given game in the present embodiment.

This operation is an example of a case in which the various types of task information and the play history of the game when the player has played the game in the past are stored in the memory 170, and the game is played at the stop-playing timing and at the restart timing different from the stop-playing timing.

First, the game control unit 114 receives the start instruction of a given game by the player from the controller 30 (Step S101), and starts performing the game control process of the task setting target game based on the task set by the initial setting of the game (Step S102).

When the game control unit 114 starts performing the task setting game, and performs various game processes based on the game data and the program, and the player's input operation transmitted from the controller 30, and displays the results of the game process on the display 40, in conjunction with the display control unit 118 and the drawing unit 120.

Next, the game control process unit 114 determines whether or not it has detected an indication of the end of the game by the player or the end of the game based on the game process (Step S103).

When determining to detect the indication of the end of the game by the player or the end of the game based on the game process, the replay process unit 114 terminates this operation, otherwise moves to the process of Step S104.

Next, the game control process unit 114 determines whether or not it has detected an indication of stop-playing to stop-playing the game by the stop-playing process by the player (Step S104).

When determining to detect the stop-playing instruction of the player, the game control process unit 114 moves to the process of Step S105. When determining not to detect the stop-playing instruction of the player, the game control process unit 114 moves back to the process of Step S103.

Next, the game management unit 117 performs the task setting process to identify the game status of the played task setting target game at the stop-playing timing, and to set a new task of the played task setting target game by identifying the task information corresponding to the identified the game status (Step S105).

Next, the game management unit 117 displays the task set by the task setting process on the display 40 in conjunction with the display control unit 118 and the drawing unit 120 (Step S106).

Next, the game management unit 117 performs the restart timing setting process to set the start timing to restart the task setting target game, that is, the restart timing of the stopped-playing game (Step S107).

Next, the game management unit 117 identifies the game status (the instruction data and the game control data) of the stopped-playing game at the set restart timing (Step S108).

The game management unit 117 maintains the game status at the stop-playing when the restart timing is the stop-playing timing.

Next, the game management unit 117 performs the setting determination process to determine the settings for starting the game from the restart timing (that is, the initial settings of the restarted game) based on the identified game status (Step S109).

When changing the part of the game status of the task setting target game, the game management unit 117 changes the settings by the player's input operation and so on.

Next, the game control unit 114 starts accepting the player's input operation and starts performing the game control process (that is, the task setting target game instruction control process) based on the determined settings (Step S110).

Once starting performing the task setting target game instruction control process, the game control unit 114 performs the game control process based on the accepted player's input operation and the determined settings until the game end instruction is input.

Finally, when detecting the game end such as victory or defeat of the player character (Step S111), the game control unit 114 performs the post-process that provides, to the player, a give reward when clearing the new set task (Step S112), and terminates the game and ends this operation.

[5] Other

The present embodiment is not limited to those in the above-described embodiments, and various modifications and variations can be made. For example, words cited as broadly or synonymously in the description or drawings may be replaced by broadly or synonymously in the description or drawings.

In embodiments, the game is not limited to a multiplayer battle game. For example, it can be used in the game with the player's input, such as race games, music games, puzzle games, shooting games, role-playing games (RPGs) or simulation games.

The present embodiment includes substantially the same configuration as the configuration described in the embodiment (for example, configuration with the same function, method and result, or configuration with the same purpose and effect). The present embodiment also includes a configuration in which non-essential parts of the configuration described in the embodiment are replaced. The present embodiment also includes a configuration that achieves the same effects as the configuration described in the embodiment or a configuration that can achieve the same purpose.

The embodiment also includes a configuration obtained by adding a known technique to the configuration described in the above embodiment.

Although the present embodiments have been described in detail as described above, it will be readily apparent to those skilled in the art that many variations are possible without departing materially from the new matter and effect of the present invention. Accordingly, all such modifications are intended to be within the scope of the present invention.

REFERENCE SIGNS LIST

S: Game system
1: Server
10: Game main unit
12: Body
13: Display unit
14: Speaker
16: Coin insertion unit
30: Controller
40: Display unit
100: Processor
110: Communication control unit
111: Object space setting unit
112: Movement and motion control unit
113: Instruction and reception process unit
114: Game control unit
115: Data management unit
116: Replay process unit
117: Game management unit
118: Display control unit
119: Virtual camera control unit
120: Drawing unit
130: Sound processor
160: Controller
162: Card-read/write unit
170: Memory unit
172: Main memory unit
176: Image buffer
180: Information storage medium
190: Display
192: Sound output unit
196: Communication unit
200: Game operation unit
260: Input unit
300: Server system
310: Server
320: Terminal device
1000: System board

What is claimed is:

1. A game system that performs a game using a player character that is controlled by a player's instruction, comprising one or more processors and one or more memories, the processor programmed to:
   manage, as task information, a task imposed by the player during playing the game according to a game identification status of a predetermined game, the task information be stored in a first memory unit;
   accept a player's input operation;
   perform a game control process to control the progress of the game by controlling a player character according to a accepted player's input operation;
   perform a stop-playing process to stop-playing the game when accepting a given player's input operation during playing the game;

identify a game status at the stop-playing timing that indicates a timing at which the game was stopped-playing by the stop-playing process or a game status up to the stop-playing timing;

identify the task information corresponding to an identified game status from among the task information stored in the first memory unit; and perform a task presentation process to present, to player, as a task of the game subject to the stop-playing timing, a task in an identified task information.

2. The game system according to claim 1,
wherein the processor is programmed to:
store, as a game data for a replay, data of the game when performing the game control process in a second memory;
replay the game by performing a replay process to read out the game data for the replay stored in the second memory and to replay game contents from a given timing according to the read out game data: and
perform the stop-playing process to stop-playing the game during the replay process when accepting a given player's input operation during the replay process.

3. The game system according to claim 1, wherein
the game status includes a length of term from the stop-playing timing to an end timing when a game progression is terminated, and
the processor is programmed to
identify the game status including the length of term, and
identify the task information from among a plurality of task information stored in the first memory unit according to an identified game status including the length of term.

4. The game system according to claim 1, wherein the processor is programmed to:
set, as a game instruction control process, a restart timing for restarting the game control process of a task setting target game that is a game used for setting the task according to the player's input operation, based on the identified stop-playing timing; and
identify, as a game status at the restart timing, the game status at the stop-playing timing or the game status up to the stop-playing timing; and perform a determination process to determine given settings of the game according to the player's input operation for the task setting target game when starting the game control process, based on the identified game status; and
perform, as a game instruction control process, the game control process from the restart timing based on the settings determined by the determination process and a accepted player's input operation.

5. The game system according to claim 1, wherein
the processor is programmed to:
identify, as the game status, the game status of an identification term, which includes the game status at the stop-playing timing, from a given timing to the stop-playing timing; and
identify the task information corresponding to the game status of the identification term from among the plurality of task information stored in the first memory unit.

6. The game system according to claim 5, wherein
the identification term includes the game status of the game when played the game in past.

7. The game system according to claim 1, wherein
the game status includes a character status of a charter which appears in the game,
the processor is programmed to identify, as the identified game status, the task information corresponding to the character status from among the plurality of task information stored in the first memory unit.

8. The game system according to claim 1, wherein
the processor is programmed to:
identify, as the game status, the game status of the game which is played by a plurality of players; and
identify the task information corresponding to the game status of the game which is played by the identified plurality of players from among the plurality of task information stored in the first memory unit.

9. The game system according to claim 1, wherein
the processor is programmed to
identify, as the game status, the game status of a player who is selected by a given condition in the game which is played by a plurality of players; and
identify the task information corresponding to the game status of the game which is played by the selected player from among the plurality of task information stored in the first memory unit.

10. The game system according to claim 1, wherein
the processor is programmed to present, to the player, information regarding the task with an identified task, as the task presentation process.

11. A method of performing a game using a player character that is controlled by a player's instruction, comprising:
managing, as task information, a task imposed by the player during playing the game according to a game identification status of a predetermined game, the task information be stored in a first memory unit;
accepting a player's input operation;
performing a game control process to control the progress of the game by controlling a player character according to a accepted player's input operation;
performing a stop-playing process to stop-playing the game when accepting a given player's input operation during playing the game;
identifying a game status at the stop-playing timing that indicates a timing at which the game was stopped-playing by the stop-playing process or a game status up to the stop-playing timing;
identifying the task information corresponding to an identified game status from among the task information stored in the first memory unit; and
performing a task presentation process to present, to player, as a task of the game subject to the stop-playing timing, a task in an identified task information.

12. A server system that provides a terminal device a game using a player character that is controlled by a player's instruction, comprising one or more processors and one or more memories, the processor programmed to:
manage, as task information, a task imposed by the player during playing the game according to a game identification status of a predetermined game, the task information be stored in a first memory unit;
accept a player's input operation;
perform a game control process to control the progress of the game by controlling a player character according to a accepted player's input operation;

perform a stop-playing process to stop-playing the game when accepting a given player's input operation during playing the game;

identify a game status at the stop-playing timing that indicates a timing at which the game was stopped-playing by the stop-playing process or a game status up to the stop-playing timing;

identify the task information corresponding to an identified game status from among the task information stored in the first memory unit; and perform a task presentation process to present, to the player, the task that is included in an identified task information, as the task of the game subject to the stop-playing timing, via the terminal device.

13. A method of providing a terminal device a game using a player character that is controlled by player's instruction, comprising:

managing, as task information, a task imposed by the player during playing the game according to a game identification status of a predetermined game, the task information be stored in a first memory unit;

accepting a player's input operation;

performing a game control process to control the progress of the game by controlling a player character according to a accepted player's input operation;

performing a stop-playing process to stop-playing the game when accepting a given player's input operation during playing the game;

identifying a game status at the stop-playing timing that indicates a timing at which the game was stopped-playing by the stop-playing process or a game status up to the stop-playing timing;

identifying the task information corresponding to an identified game status from among the task information stored in the first memory unit; and performing a task presentation process to present, to the player, the task that is included in an identified task information, as the task of the game subject to the stop-playing timing, via the terminal device.

* * * * *